United States Patent
Goldman et al.

(10) Patent No.: US 9,037,660 B2
(45) Date of Patent: *May 19, 2015

(54) MANAGING ELECTRONIC MESSAGES

(75) Inventors: Phillip York Goldman, Los Altos, CA (US); Susan Rayl Goldman, legal representative, Los Altos, CA (US); Richard A. Landsman, Scotts Valley, CA (US); Jay Logue, San Jose, CA (US); Jeffrey N. Heiner, Los Altos, CA (US); John S. Evans, Mountain View, CA (US); Michael R. Migliore, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 13/311,114

(22) Filed: Dec. 5, 2011

(65) Prior Publication Data

US 2012/0079050 A1    Mar. 29, 2012

Related U.S. Application Data

(60) Continuation of application No. 12/537,068, filed on Aug. 6, 2009, now Pat. No. 8,073,916, which is a division of application No. 10/841,767, filed on May 7, 2004, now Pat. No. 7,590,695.

(60) Provisional application No. 60/469,199, filed on May 9, 2003.

(51) Int. Cl.
*G06F 15/16* (2006.01)
*H04L 29/06* (2006.01)
*H04L 12/58* (2006.01)

(52) U.S. Cl.
CPC .......... *H04L 63/0823* (2013.01); *H04L 12/585* (2013.01); *H04L 51/12* (2013.01)

(58) Field of Classification Search
CPC . G06Q 10/107; G06Q 10/0875; G06Q 10/08; G06Q 10/083; G06Q 10/109; G06Q 30/02; G06Q 30/0611; G06Q 30/0222; G06Q 30/0236; G06Q 30/0239; G06Q 30/04; G06Q 30/06; G06Q 40/04; G06Q 40/00; G06Q 40/02; G06Q 20/00; G06Q 20/02; G06Q 20/10; G06Q 20/102; G06Q 20/26; H04L 51/12; H04L 51/14; H04L 51/28; H04L 12/585; H04L 12/5885; H04L 29/06; H04L 63/145
USPC ........... 709/209, 202, 203, 204, 217; 713/201
See application file for complete search history.

(56) References Cited

U.S. PATENT DOCUMENTS 4,206,315 A    6/1980 Matyas et al.
(Continued)

FOREIGN PATENT DOCUMENTS

DE    19708856    9/1998
(Continued)

OTHER PUBLICATIONS

Aguilar, Rose, AOL fights to ban junk, CNETNews.com, Sep. 6, 1996, 3 pages, http://www.news.com/News/Item/0.43106,00.html.
(Continued)

*Primary Examiner* — Eleni Shiferaw
*Assistant Examiner* — Gregory M Elmore
(74) *Attorney, Agent, or Firm* — Morgan, Lewis & Bockius LLP

(57) ABSTRACT

A recipient computer system may receive one or more electronic messages. The recipient computer system may send one, two, or more challenge messages to the sender of the electronic messages in determining whether to deliver the electronic message. The recipient computer system may accept or reject an electronic message based on the response, or lack of response, to the challenge messages. The recipient computer system may send two or more challenge messages at intervals. A sender computer system may record activity of the sender computer system for a recipient computer system to use in determining whether to deliver an electronic message. A sender computer system may provide a summary of that activity with an electronic message. A sender computer system may provide an authorization key for a recipient computer system to use in determining whether to deliver an electronic message. The authorization key may be generated by a third party.

9 Claims, 3 Drawing Sheets

(56) References Cited

U.S. PATENT DOCUMENTS

| | | |
|---|---|---|
| 4,425,665 A | 1/1984 | Stauffer |
| 4,626,836 A | 12/1986 | Curtis et al. |
| 4,638,356 A | 1/1987 | Frezza |
| 4,807,154 A | 2/1989 | Scully et al. |
| 4,807,155 A | 2/1989 | Cree et al. |
| 4,817,018 A | 3/1989 | Cree et al. |
| 4,819,191 A | 4/1989 | Scully et al. |
| 4,831,552 A | 5/1989 | Scully et al. |
| 4,866,611 A | 9/1989 | Cree et al. |
| 4,977,520 A | 12/1990 | McGaughey, III et al. |
| 5,023,851 A | 6/1991 | Murray et al. |
| 5,040,141 A | 8/1991 | Yazima et al. |
| 5,050,077 A | 9/1991 | Vincent |
| 5,093,918 A | 3/1992 | Heyen et al. |
| 5,124,912 A | 6/1992 | Hotaling et al. |
| 5,129,057 A | 7/1992 | Strope et al. |
| 5,159,673 A | 10/1992 | Sackmann et al. |
| 5,197,000 A | 3/1993 | Vincent |
| 5,202,890 A | 4/1993 | Iketani et al. |
| 5,204,961 A | 4/1993 | Barlow |
| 5,245,532 A | 9/1993 | Mourier |
| 5,261,045 A | 11/1993 | Scully et al. |
| 5,283,856 A | 2/1994 | Gross et al. |
| 5,319,776 A | 6/1994 | Hile et al. |
| 5,323,314 A | 6/1994 | Baber et al. |
| 5,327,486 A | 7/1994 | Wolff et al. |
| 5,329,578 A | 7/1994 | Brennan et al. |
| 5,333,266 A | 7/1994 | Boaz et al. |
| 5,377,354 A | 12/1994 | Scannell et al. |
| 5,423,042 A | 6/1995 | Jalili et al. |
| 5,448,734 A | 9/1995 | Hrabik et al. |
| 5,457,476 A | 10/1995 | Jenson |
| 5,467,388 A | 11/1995 | Redd et al. |
| 5,471,519 A | 11/1995 | Howe et al. |
| 5,473,671 A | 12/1995 | Partridge, III |
| 5,487,100 A | 1/1996 | Kane |
| 5,493,221 A | 2/1996 | Wertz |
| 5,533,110 A | 7/1996 | Pinard et al. |
| 5,539,828 A | 7/1996 | Davis |
| 5,548,789 A | 8/1996 | Nakanura |
| 5,557,659 A | 9/1996 | Hyde-Thomson |
| 5,572,246 A | 11/1996 | Ellis et al. |
| 5,572,667 A | 11/1996 | Ideta |
| 5,583,920 A | 12/1996 | Wheeler, Jr. |
| 5,600,799 A | 2/1997 | Young et al. |
| 5,604,803 A | 2/1997 | Aziz |
| 5,608,786 A | 3/1997 | Gordon |
| 5,619,648 A | 4/1997 | Canale et al. |
| 5,627,764 A | 5/1997 | Schutzman et al. |
| 5,630,123 A | 5/1997 | Hogge |
| 5,632,018 A | 5/1997 | Otorii |
| 5,655,079 A | 8/1997 | Hirasawa et al. |
| 5,671,333 A | 9/1997 | Catlett et al. |
| 5,694,616 A | 12/1997 | Johnson et al. |
| 5,721,779 A | 2/1998 | Funk |
| 5,734,903 A | 3/1998 | Saulpaugh et al. |
| 5,742,668 A | 4/1998 | Pepe et al. |
| 5,742,769 A | 4/1998 | Lee et al. |
| 5,781,857 A | 7/1998 | Hwang et al. |
| 5,793,365 A | 8/1998 | Tang et al. |
| 5,796,840 A | 8/1998 | Davis |
| 5,796,863 A | 8/1998 | Lyon |
| 5,805,730 A | 9/1998 | Yaeger et al. |
| 5,805,731 A | 9/1998 | Yaeger et al. |
| 5,826,022 A | 10/1998 | Nielsen |
| 5,832,227 A | 11/1998 | Anderson et al. |
| 5,835,087 A | 11/1998 | Herz et al. |
| 5,835,722 A | 11/1998 | Bradshaw et al. |
| 5,857,708 A | 1/1999 | Harvey |
| 5,859,967 A | 1/1999 | Kaufeld et al. |
| 5,872,917 A | 2/1999 | Hellman |
| 5,878,219 A | 3/1999 | Vance, Jr. et al. |
| 5,884,033 A | 3/1999 | Duvall et al. |
| 5,893,911 A | 4/1999 | Piskiel et al. |
| 5,909,589 A | 6/1999 | Parker et al. |
| 5,917,489 A | 6/1999 | Thurlow et al. |
| 5,930,471 A | 7/1999 | Milewski et al. |
| 5,930,479 A | 7/1999 | Hall |
| 5,937,160 A | 8/1999 | Davis et al. |
| 5,937,162 A | 8/1999 | Funk et al. |
| 5,944,786 A | 8/1999 | Quinn |
| 5,948,040 A | 9/1999 | DeLorme et al. |
| 5,960,406 A | 9/1999 | Rasansky et al. |
| 5,960,411 A | 9/1999 | Hartman et al. |
| 5,978,791 A | 11/1999 | Farber et al. |
| 5,987,508 A | 11/1999 | Agraharam et al. |
| 5,987,606 A | 11/1999 | Cirasole et al. |
| 5,999,600 A | 12/1999 | Shin |
| 5,999,932 A | 12/1999 | Paul |
| 5,999,967 A | 12/1999 | Sundsted |
| 6,006,228 A | 12/1999 | McCollum et al. |
| 6,012,051 A | 1/2000 | Sammon, Jr. et al. |
| 6,014,634 A | 1/2000 | Scroggie et al. |
| 6,014,638 A | 1/2000 | Burge et al. |
| 6,016,478 A | 1/2000 | Zhang et al. |
| 6,018,343 A | 1/2000 | Wang et al. |
| 6,018,761 A | 1/2000 | Uomini |
| 6,018,774 A | 1/2000 | Mayle et al. |
| 6,023,723 A | 2/2000 | McCormick et al. |
| 6,026,403 A | 2/2000 | Siefert |
| 6,029,195 A | 2/2000 | Herz |
| 6,047,260 A | 4/2000 | Levinson |
| 6,052,709 A | 4/2000 | Paul |
| 6,055,510 A | 4/2000 | Henrick et al. |
| 6,057,841 A | 5/2000 | Thurlow et al. |
| 6,058,428 A | 5/2000 | Wang et al. |
| 6,073,142 A | 6/2000 | Geiger et al. |
| 6,076,111 A | 6/2000 | Chiu et al. |
| 6,085,166 A | 7/2000 | Beckhardt et al. |
| 6,085,249 A | 7/2000 | Wang et al. |
| 6,092,067 A | 7/2000 | Girling et al. |
| 6,092,101 A | 7/2000 | Birrell et al. |
| 6,097,389 A | 8/2000 | Morris et al. |
| 6,104,990 A | 8/2000 | Chaney et al. |
| 6,107,990 A | 8/2000 | Fleming |
| 6,111,572 A | 8/2000 | Blair et al. |
| 6,112,227 A | 8/2000 | Heiner |
| 6,141,686 A | 10/2000 | Jackowski et al. |
| 6,144,934 A | 11/2000 | Stockwell et al. |
| 6,151,584 A | 11/2000 | Papierniak et al. |
| 6,154,765 A | 11/2000 | Hart |
| 6,160,518 A | 12/2000 | Miyahara et al. |
| 6,161,130 A | 12/2000 | Horvitz et al. |
| 6,161,630 A | 12/2000 | Horvitz et al. |
| 6,167,434 A | 12/2000 | Pang |
| 6,173,322 B1 | 1/2001 | Hu |
| 6,182,118 B1 | 1/2001 | Finney et al. |
| 6,189,026 B1 | 2/2001 | Birrell et al. |
| 6,195,354 B1 | 2/2001 | Skalecki et al. |
| 6,195,698 B1 | 2/2001 | Lillibridge et al. |
| 6,199,102 B1 | 3/2001 | Cobb |
| 6,199,103 B1 | 3/2001 | Sakaguchi et al. |
| 6,199,106 B1 | 3/2001 | Shaw et al. |
| 6,202,061 B1 | 3/2001 | Khosla et al. |
| 6,205,432 B1 | 3/2001 | Gabbard et al. |
| 6,216,110 B1 | 4/2001 | Silverberg |
| 6,226,372 B1 | 5/2001 | Beebe et al. |
| 6,230,188 B1 | 5/2001 | Marcus |
| 6,237,027 B1 | 5/2001 | Namekawa |
| 6,240,424 B1 | 5/2001 | Hirata |
| 6,249,805 B1 | 6/2001 | Fleming, III |
| 6,249,807 B1 | 6/2001 | Shaw et al. |
| 6,263,507 B1 | 7/2001 | Ahmad et al. |
| 6,266,692 B1 | 7/2001 | Greenstein |
| 6,266,814 B1 | 7/2001 | Lemmons et al. |
| 6,269,369 B1 | 7/2001 | Robertson |
| 6,275,810 B1 | 8/2001 | Hetherington et al. |
| 6,278,456 B1 | 8/2001 | Wang et al. |
| 6,282,565 B1 | 8/2001 | Shaw et al. |
| 6,301,608 B1 | 10/2001 | Rochkind |
| 6,310,946 B1 | 10/2001 | Bauer et al. |
| 6,321,267 B1 | 11/2001 | Donaldson |
| 6,330,590 B1 | 12/2001 | Cotten |
| 6,336,117 B1 | 1/2002 | Massarani |

(56) References Cited

U.S. PATENT DOCUMENTS

| | | | |
|---|---|---|---|
| 6,341,349 B1 | 1/2002 | Takaragi et al. |
| 6,345,260 B1 | 2/2002 | Cummings, Jr. et al. |
| 6,349,296 B1 | 2/2002 | Broder et al. |
| 6,349,328 B1 | 2/2002 | Haneda et al. |
| 6,353,848 B1 | 3/2002 | Morris |
| 6,356,935 B1 | 3/2002 | Gibbs |
| 6,356,937 B1 | 3/2002 | Montville et al. |
| 6,366,661 B1 | 4/2002 | Devillier et al. |
| 6,366,950 B1 | 4/2002 | Scheussler et al. |
| 6,373,950 B1 | 4/2002 | Rowney |
| 6,393,464 B1 | 5/2002 | Dieterman |
| 6,393,465 B2 | 5/2002 | Leeds |
| 6,405,319 B1 | 6/2002 | Arnold et al. |
| 6,421,709 B1 | 7/2002 | McCormick et al. |
| 6,438,597 B1 | 8/2002 | Mosberger et al. |
| 6,453,327 B1 | 9/2002 | Nielsen |
| 6,457,044 B1 | 9/2002 | IwaZaki |
| 6,460,044 B1 | 10/2002 | Wang |
| 6,460,074 B1 | 10/2002 | Fishkin |
| 6,466,918 B1 | 10/2002 | Spiegel et al. |
| 6,477,544 B1 | 11/2002 | Bolosky et al. |
| 6,484,197 B1 | 11/2002 | Donohue |
| 6,490,455 B1 | 12/2002 | Park et al. |
| 6,493,107 B1 | 12/2002 | Toyoda et al. |
| 6,507,866 B1 | 1/2003 | Barchi |
| 6,519,703 B1 | 2/2003 | Joyce |
| 6,523,115 B1 | 2/2003 | Ono et al. |
| 6,542,943 B2 | 4/2003 | Cheng et al. |
| 6,546,416 B1 | 4/2003 | Kirsch |
| 6,549,416 B2 | 4/2003 | Sterner et al. |
| 6,584,564 B2 | 6/2003 | Olkin et al. |
| 6,587,550 B2 | 7/2003 | Council et al. |
| 6,599,139 B1 | 7/2003 | Hunter |
| 6,600,750 B1 | 7/2003 | Joffe et al. |
| 6,625,257 B1 | 9/2003 | Asaoka et al. |
| 6,633,311 B1 | 10/2003 | Douvikas et al. |
| 6,640,230 B1 | 10/2003 | Alexander et al. |
| 6,640,301 B1 | 10/2003 | Ng |
| 6,650,890 B1 | 11/2003 | Irlam et al. |
| 6,654,787 B1 | 11/2003 | Aronson et al. |
| 6,660,590 B2 | 12/2003 | Yoo |
| 6,671,357 B1 | 12/2003 | Roberts, Jr. |
| 6,671,718 B1 | 12/2003 | Meister et al. |
| 6,678,704 B1 | 1/2004 | Bridge, Jr. et al. |
| 6,691,156 B1 | 2/2004 | Drummond et al. |
| 6,701,440 B1 | 3/2004 | Kim et al. |
| 6,704,729 B1 | 3/2004 | Klein et al. |
| 6,708,205 B2 | 3/2004 | Sheldon et al. |
| 6,714,967 B1 | 3/2004 | Horvitz |
| 6,714,982 B1 | 3/2004 | McDonough et al. |
| 6,725,381 B1 | 4/2004 | Smith et al. |
| 6,728,785 B1 | 4/2004 | Jungck |
| 6,732,149 B1 | 5/2004 | Kephart |
| 6,745,936 B1 | 6/2004 | Movalli et al. |
| 6,748,422 B2 | 6/2004 | Morin et al. |
| 6,751,626 B2 | 6/2004 | Brown et al. |
| 6,757,830 B1 | 6/2004 | Tarbotton et al. |
| 6,760,752 B1 | 7/2004 | Liu et al. |
| 6,763,462 B1 | 7/2004 | Marsh |
| 6,766,352 B1 | 7/2004 | McBrearty et al. |
| 6,772,196 B1 | 8/2004 | Kirsch et al. |
| 6,785,679 B1 | 8/2004 | Dane et al. |
| 6,799,352 B2 | 10/2004 | Gilchrist et al. |
| 6,816,863 B2 | 11/2004 | Bates et al. |
| 6,820,204 B1 | 11/2004 | Desai et al. |
| 6,823,323 B2 | 11/2004 | Forman et al. |
| 6,829,607 B1 | 12/2004 | Tafoya et al. |
| 6,829,635 B1 | 12/2004 | Townshend |
| 6,845,374 B1 | 1/2005 | Oliver et al. |
| 6,856,963 B1 | 2/2005 | Hurwitz |
| 6,868,498 B1 | 3/2005 | Katsikas |
| 6,880,088 B1 | 4/2005 | Grazier et al. |
| 6,883,095 B2 | 4/2005 | Sandhu et al. |
| 6,901,398 B1 | 5/2005 | Horvitz et al. |
| 6,963,900 B2 | 11/2005 | Boyd |
| 6,976,207 B1 | 12/2005 | Rujan et al. |
| 6,978,419 B1 | 12/2005 | Kantrowitz |
| 7,016,939 B1 | 3/2006 | Rothwell et al. |
| 7,043,753 B2 | 5/2006 | Roddy et al. |
| 7,062,498 B2 | 6/2006 | Al-Kofahi et al. |
| 7,065,341 B2 | 6/2006 | Kamiyama et al. |
| 7,072,942 B1 | 7/2006 | Maller |
| 7,076,533 B1 | 7/2006 | Knox et al. |
| 7,085,925 B2 | 8/2006 | Hanna et al. |
| 7,089,238 B1 | 8/2006 | Davis et al. |
| 7,089,241 B1 | 8/2006 | Alspector et al. |
| 7,092,992 B1 | 8/2006 | Yu |
| 7,120,927 B1 | 10/2006 | Beyda et al. |
| 7,133,898 B1 | 11/2006 | Malik |
| 7,136,897 B1 | 11/2006 | Raghunandan |
| 7,149,778 B1 | 12/2006 | Patel et al. |
| 7,174,303 B2 | 2/2007 | Glazer et al. |
| 7,177,905 B1 | 2/2007 | Slutsman et al. |
| 7,185,194 B2 | 2/2007 | Morikawa et al. |
| 7,185,359 B2 | 2/2007 | Schmidt et al. |
| 7,188,073 B1 | 3/2007 | Tam et al. |
| 7,188,358 B1 | 3/2007 | Hisada et al. |
| 7,200,606 B2 | 4/2007 | Elkan |
| 7,231,427 B1 | 6/2007 | Du |
| 7,249,175 B1 | 7/2007 | Donaldson |
| 7,263,545 B2 | 8/2007 | Digate et al. |
| 7,280,975 B1 | 10/2007 | Donner |
| 7,283,970 B2 | 10/2007 | Cragun et al. |
| 7,299,193 B2 | 11/2007 | Cragun et al. |
| 7,346,696 B2 | 3/2008 | Malik |
| 7,383,433 B2 | 6/2008 | Yeager et al. |
| 7,395,221 B2 | 7/2008 | Doss et al. |
| 7,512,788 B2 | 3/2009 | Choi et al. |
| 7,523,191 B1* | 4/2009 | Thomas et al. ............... 709/224 |
| 7,587,327 B2 | 9/2009 | Jacobs et al. |
| 7,590,695 B2 | 9/2009 | Landsman et al. |
| 7,636,683 B1 | 12/2009 | Mills et al. |
| 7,865,387 B2 | 1/2011 | Mansour |
| 7,870,200 B2 | 1/2011 | Slater et al. |
| 7,912,745 B2 | 3/2011 | Mansour |
| 7,971,150 B2 | 6/2011 | Raskutti et al. |
| 7,974,849 B1* | 7/2011 | Begole et al. ................... 705/1.1 |
| 8,073,916 B2* | 12/2011 | Landsman et al. ............ 709/206 |
| 8,239,236 B2 | 8/2012 | Mansour |
| 2001/0011225 A1 | 8/2001 | O'Connor et al. |
| 2001/0027472 A1 | 10/2001 | Guan |
| 2001/0027481 A1 | 10/2001 | Whyel |
| 2001/0032245 A1 | 10/2001 | Fodor |
| 2001/0054072 A1 | 12/2001 | Discolo et al. |
| 2002/0021809 A1 | 2/2002 | Salo et al. |
| 2002/0023132 A1 | 2/2002 | Tornabene et al. |
| 2002/0032602 A1 | 3/2002 | Lanzillo et al. |
| 2002/0035493 A1 | 3/2002 | Mozayeny et al. |
| 2002/0042815 A1 | 4/2002 | Salzfass et al. |
| 2002/0046099 A1 | 4/2002 | Frengut et al. |
| 2002/0046250 A1 | 4/2002 | Nassiri |
| 2002/0049751 A1 | 4/2002 | Chen et al. |
| 2002/0055940 A1 | 5/2002 | Elkan |
| 2002/0078158 A1 | 6/2002 | Brown et al. |
| 2002/0078441 A1 | 6/2002 | Drake et al. |
| 2002/0083068 A1 | 6/2002 | Quass et al. |
| 2002/0099675 A1 | 7/2002 | Agrafiotis et al. |
| 2002/0099781 A1 | 7/2002 | Scheussler et al. |
| 2002/0099938 A1 | 7/2002 | Spitz |
| 2002/0104021 A1 | 8/2002 | Gross |
| 2002/0107856 A1 | 8/2002 | Scheussler et al. |
| 2002/0116463 A1 | 8/2002 | Hart |
| 2002/0116506 A1 | 8/2002 | Lautner |
| 2002/0116508 A1 | 8/2002 | Khan et al. |
| 2002/0116641 A1 | 8/2002 | Mastrianni |
| 2002/0124170 A1 | 9/2002 | Johnson, Jr. |
| 2002/0132607 A1 | 9/2002 | Castell et al. |
| 2002/0143770 A1 | 10/2002 | Schran et al. |
| 2002/0144136 A1 | 10/2002 | Stornetta, Jr. et al. |
| 2002/0147726 A1 | 10/2002 | Yehia et al. |
| 2002/0147754 A1 | 10/2002 | Dempsey et al. |
| 2002/0147777 A1 | 10/2002 | Hackbarth et al. |
| 2002/0152272 A1 | 10/2002 | Yairi |
| 2002/0156895 A1 | 10/2002 | Brown |

(56) References Cited

U.S. PATENT DOCUMENTS

| | | |
|---|---|---|
| 2002/0166117 A1 | 11/2002 | Abrams et al. |
| 2002/0178086 A1 | 11/2002 | Margeson et al. |
| 2002/0181703 A1 | 12/2002 | Logan et al. |
| 2002/0184624 A1 | 12/2002 | Spencer |
| 2002/0194308 A1 | 12/2002 | Hall |
| 2002/0199095 A1 | 12/2002 | Bandini et al. |
| 2003/0009385 A1 | 1/2003 | Tucciarone et al. |
| 2003/0009387 A1 | 1/2003 | Argust |
| 2003/0009698 A1 | 1/2003 | Lindeman et al. |
| 2003/0023736 A1 | 1/2003 | Abkemeier |
| 2003/0028606 A1 | 2/2003 | Koopmans et al. |
| 2003/0030680 A1 | 2/2003 | Cofta et al. |
| 2003/0036941 A1 | 2/2003 | Leska et al. |
| 2003/0037041 A1 | 2/2003 | Hertz |
| 2003/0037103 A1 | 2/2003 | Salmi et al. |
| 2003/0037250 A1 | 2/2003 | Walker et al. |
| 2003/0046421 A1 | 3/2003 | Horvitz et al. |
| 2003/0050981 A1 | 3/2003 | Banerjee et al. |
| 2003/0056100 A1 | 3/2003 | Beatson |
| 2003/0065926 A1 | 4/2003 | Schultz et al. |
| 2003/0069874 A1 | 4/2003 | Hertzog et al. |
| 2003/0081621 A1 | 5/2003 | Godfrey et al. |
| 2003/0086543 A1 | 5/2003 | Raymond |
| 2003/0095527 A1 | 5/2003 | Shanbhag |
| 2003/0097597 A1 | 5/2003 | Lewis |
| 2003/0101181 A1 | 5/2003 | Al-Kofahi et al. |
| 2003/0110181 A1 | 6/2003 | Schuetze et al. |
| 2003/0110212 A1 | 6/2003 | Lewis |
| 2003/0110400 A1 | 6/2003 | Cartmell et al. |
| 2003/0163691 A1 | 8/2003 | Johnson |
| 2003/0167311 A1 | 9/2003 | Kirsch |
| 2003/0167402 A1 | 9/2003 | Stolfo et al. |
| 2003/0172167 A1 | 9/2003 | Judge et al. |
| 2003/0172291 A1 | 9/2003 | Judge et al. |
| 2003/0172294 A1 | 9/2003 | Judge |
| 2003/0187699 A1 | 10/2003 | Bonissone et al. |
| 2003/0191969 A1 | 10/2003 | Katsikas |
| 2003/0195937 A1 | 10/2003 | Kircher et al. |
| 2003/0196116 A1 | 10/2003 | Troutman |
| 2003/0200267 A1 | 10/2003 | Garrigues |
| 2003/0204569 A1* | 10/2003 | Andrews et al. ............ 709/206 |
| 2003/0212791 A1 | 11/2003 | Pickup |
| 2003/0220978 A1 | 11/2003 | Rhodes |
| 2003/0225841 A1 | 12/2003 | Song et al. |
| 2003/0231207 A1 | 12/2003 | Huang |
| 2003/0233418 A1 | 12/2003 | Goldman |
| 2003/0236847 A1 | 12/2003 | Benowitz et al. |
| 2004/0003283 A1* | 1/2004 | Goodman et al. ............ 713/201 |
| 2004/0015554 A1* | 1/2004 | Wilson ..................... 709/206 |
| 2004/0029087 A1 | 2/2004 | White |
| 2004/0039912 A1 | 2/2004 | Borrowman et al. |
| 2004/0044996 A1 | 3/2004 | Atallah |
| 2004/0054741 A1 | 3/2004 | Weatherby et al. |
| 2004/0054887 A1 | 3/2004 | Paulsen, Jr. et al. |
| 2004/0083270 A1 | 4/2004 | Heckerman et al. |
| 2004/0087300 A1 | 5/2004 | Lewis |
| 2004/0111478 A1 | 6/2004 | Gross et al. |
| 2004/0111480 A1 | 6/2004 | Yue |
| 2004/0120488 A1 | 6/2004 | Dempsey et al. |
| 2004/0128355 A1 | 7/2004 | Chao et al. |
| 2004/0139327 A1 | 7/2004 | Brown et al. |
| 2004/0143633 A1 | 7/2004 | McCarty |
| 2004/0148330 A1 | 7/2004 | Alspector et al. |
| 2004/0148358 A1 | 7/2004 | Singh et al. |
| 2004/0167941 A1 | 8/2004 | Prahlad et al. |
| 2004/0176072 A1 | 9/2004 | Gellens |
| 2004/0181462 A1 | 9/2004 | Bauer et al. |
| 2004/0181581 A1 | 9/2004 | Kosco |
| 2004/0199595 A1 | 10/2004 | Banister et al. |
| 2004/0236835 A1 | 11/2004 | Blankenship |
| 2004/0236838 A1 | 11/2004 | Trout |
| 2004/0243676 A1 | 12/2004 | Blankenship |
| 2004/0243698 A1 | 12/2004 | Blankenship |
| 2004/0255120 A1 | 12/2004 | Botti et al. |
| 2005/0012674 A1 | 1/2005 | Takei |
| 2005/0015481 A1 | 1/2005 | Blankenship |
| 2005/0015482 A1 | 1/2005 | Blankenship |
| 2005/0021290 A1 | 1/2005 | Velipasaoglu et al. |
| 2005/0076220 A1 | 4/2005 | Zhang et al. |
| 2005/0076221 A1 | 4/2005 | Olkin et al. |
| 2005/0076222 A1 | 4/2005 | Olkin et al. |
| 2005/0081059 A1 | 4/2005 | Bandini et al. |
| 2005/0188045 A1 | 8/2005 | Katsikas |
| 2006/0027648 A1 | 2/2006 | Cheah |
| 2006/0036701 A1 | 2/2006 | Bulfer et al. |
| 2006/0059238 A1 | 3/2006 | Slater et al. |
| 2006/0079275 A1 | 4/2006 | Ella et al. |
| 2006/0095527 A1 | 5/2006 | Malik |
| 2006/0101021 A1 | 5/2006 | Davis et al. |
| 2006/0112038 A1 | 5/2006 | Luo |
| 2006/0112165 A9 | 5/2006 | Tomkow et al. |
| 2006/0149809 A1 | 7/2006 | Salo et al. |
| 2006/0168048 A1 | 7/2006 | Lyle et al. |
| 2006/0190481 A1 | 8/2006 | Alspector et al. |
| 2007/0016641 A1 | 1/2007 | Broomhall |
| 2008/0162926 A1 | 7/2008 | Xiong et al. |
| 2009/0006842 A1 | 1/2009 | Ross et al. |
| 2009/0006860 A1 | 1/2009 | Ross |
| 2011/0106894 A1 | 5/2011 | Hodge et al. |

FOREIGN PATENT DOCUMENTS

| | | |
|---|---|---|
| EP | 0276424 A2 | 8/1988 |
| EP | 0276425 A2 | 8/1988 |
| EP | 0276426 A1 | 8/1988 |
| EP | 0276428 A2 | 8/1988 |
| EP | 0276429 A2 | 8/1988 |
| EP | 0323703 A2 | 7/1989 |
| EP | 0326778 A2 | 8/1989 |
| EP | 0 463 252 | 1/1992 |
| EP | 0 651 533 | 5/1995 |
| EP | 0 686 327 | 12/1995 |
| EP | 0 721 268 | 7/1996 |
| EP | 0 725 523 | 8/1996 |
| EP | 0 760 565 | 3/1997 |
| EP | 0851355 A2 | 7/1998 |
| EP | 0 883 271 | 12/1998 |
| EP | 0982927 AI | 3/2000 |
| EP | 1122672 A2 | 8/2001 |
| EP | 1168167 A2 | 1/2002 |
| EP | 0942374 B1 | 3/2003 |
| EP | 2364474 A2 | 9/2011 |
| GB | 2364474 A | 1/2002 |
| JP | 1-190133 | 7/1989 |
| JP | 7-200343 | 8/1995 |
| JP | 411187235 A | 7/1999 |
| JP | 2000-261493 A | 9/2000 |
| JP | 2001-125851 A | 5/2001 |
| JP | 2001-167158 A | 6/2001 |
| JP | 2002-163341 | 6/2002 |
| KR | 2006-0016374 | 10/2006 |
| WO | WO 94/06236 | 3/1994 |
| WO | WO 96/09714 | 3/1996 |
| WO | WO 96/24213 | 8/1996 |
| WO | WO 97/14234 | 4/1997 |
| WO | WO 97/20423 | 6/1997 |
| WO | WO 97/23082 | 6/1997 |
| WO | WO 97/24825 | 7/1997 |
| WO | WO 97/26709 | 7/1997 |
| WO | WO 98/37675 | 8/1998 |
| WO | WO 99/10817 | 3/1999 |
| WO | WO 01/16695 | 3/2001 |
| WO | WO 01/27873 | 4/2001 |
| WO | WO 02/077768 | 10/2002 |
| WO | WO 03/044617 | 5/2003 |
| WO | WO 03/088510 A1 | 10/2003 |

OTHER PUBLICATIONS

Andrew Leonard, SpamBomers, Sep. 1997, 7 pages, Salon Magazine + about 21st + newsletter.

Bob Tiptrie, A Way to Stop Spam Messages, online, retrieved Apr. 25, 2003, 4 pages, retrieved from the internet http://groups.google.com/groups.

(56) References Cited

OTHER PUBLICATIONS

Cementing Online Partnerships and Improving User Experience, RSA Security, retrieved online May 17, 2006, 7 pages, www.rsasecurity.com.
Chinese Abstract for CN 1117680, published Feb. 28, 1996.
CNET News.com staff, ISP: Internet Spam Provider, Feb. 18, 1997, 2 pages, CNET News.com.
Cole-Gomolski, Barb, Adoption of S/MIME still lagging, May 11, 1998, 4 pages, http://www.computerworld.com/home/features.nsf/....
Controlling E-mail Spam, online, retrieved on Mar. 28, 2003, 5 pages, retrieved from the Internet http://spam.abuse.net/adminhelp/mail.shtml.
Cynthia Dwork et al., Pricing via Processing or Combatting Junk Mail, Jul. 2002, 12 pages, Technical Report CS95-20, Matematics & Computer Science, Weizmann Institute of Science.
Cynthia Dwork, Fighting Spam May be Easier Than You Think, 1992, 30 pages, presentation given in Crypto.
Cynthia Dwork, Fighting Spam: The Science, 2004, pp. 3-4, M. Farach-Colton (Ed.): Latin 2004, LNCS 2976, Springer-Verlag Berlin.
D.J. Bernstein, Variable Envelope Return Paths, Feb. 1, 1997, 2 pages, http://cr.yp.to/proto/verp.txt.
David A. Wheeler, Countering Spam with Ham-Authenticated Email and the Guarded Email Protocol, Draft: First version Dec. 8, 2002; Released Apr. 2, 2003, 28 pages, dwheeler@dwheeler.com.
David F. Skoll, How to make SURE a human is sending you mail (was Re: Random e-mails), Nov. 15, 2006, 2 pages, news.admin.net-abuse.usenet, http://groups.google.com/group/news.admin.net-abuse.usenet/msg/e601783e8f40c54?d....
Dealing with Unsolicited Commercial Email (UCE, "email spam"), 2005 Public Access Networks Corporation, online, retrieved on Jun. 6, 2003, 3 pages, retrieved from the Internet http://www.panix.com/uce.html, Copyright 2003.
Douglas G. Henke, All Hail Emperor Lewis?, online, Feb. 20, 1997, 2 pages, retrieved Apr. 25, 2003, retrieved from the internet http://groups.google.com/groups.
Ed Foster, The Gripe Line Threatening legal action may be the quickest way off a junk e-mailer's list, Info World Info Quote, Sep. 9, 1996, 2 pages, vol. 18, Issue 37, http://www.infoworld.com/egi-bin/siplayArchives.pl?....
Foiling Spam with an Email Password System, online, retrieved on Jun. 28, 2004, 10 pages, retrieved from the Internet, http://www.uwasa.fi/~ts/info/spamfoil.html.
J. Klensin et al., IMAP/POP Authorize Extension for Simple Challenge/Response, Sep. 1997, 5 pages.
Jameson, Bob, Filter for mail not addressed to you, Jesse Berst's Anchor Desk, Sep. 6, 1996, 3 pages, http://www.news.com/News/Item/0.43106,00.html.
Janet Kornblum, Programmer Writes Spam Bomb, Aug. 6, 1997, 2 pages, CNET News.com.
Julian Byrne, My Spamblock; Was: Thwarting UCE Address Culling Programs, online, Jan. 19, 1997, 2 pages, retrieved Apr. 28, 2003, retrieved from the internet http://google.com/groups.
Julian Byrne, New Improved EZSPAM! Was: My Spamblock..., online, Jan. 28, 1997, 4 pages, retrieved Apr. 25, 2003, retrieved from the internet, http://groups.google.com/groups.
Lorrie Faith Crano et al, Spam!, Aug. 1998, pp. 74-83, Communications of the ACM, vol. 41, No. 8.
MailCircuit's Email HandShake Verification and Spam Filter Process, online, copyright 1996-2003, 2 pages, MailCircuit.com, retrieved from the Internet http://www.mailcircuit.com/filter.htm.
Michael's Stop Junk E-Mail, Stop Junk E-mail, Nov. 17, 1996, 2 pages, http://www.crl.com/-michaelp/stopjunkmail.html.
Mihir Bellare et al., Does Parallel Repetition Lower the Error in Computationally Sound Protocols?, 1997, 24 pages, Proceedings of the 38th Symposium on Foundations of Computer Science, IEEE.
MIT LCS, Applied Security Reading Group, by Email Sit and Kevin Fu, 2 pages, updated May 5, 2003 on the Internet http://www.pdocs.lcs.mit.edu/asrg/.
NAGS Spam Filter, 11 pages, http://www.nags.org/spamfilter.html.
Noni Naor, Verification of a Human in the Loop or Identification via the Turing Test, Sep. 1996, Cited in All On-Line Papers.
P. Resnick, RFC 2822, Apr. 2001, 51 pages, Qualcom Incorporated, http:rfc.net/rfc2822.html.
Paul Hoffman et al., Unsolicited Bulk Email: Mechanisms for Control, Internet Mail Corsortium Report UBE-SOL, IMCR-2008, revised May 4, 1998, 16 pages.
Paul Hoffman et al., Unsolicited Bulk Email: Mechanisms for Control, internet Mail Corsortium Report UBE-SOL, IMCR-0005, Oct. 13, 1997, 31 pages.
Public Access Networks Corporation, Responding to Unsolicited Commercial Email (UCE, "email spam"), Feb. 25, 1997, 5 pages, http:www.panix.com/uce.html.
Ronald F. Guilmette, to Mung or Not to Mung, online, Jul. 24, 1997, 2 pages, retrieved Apr. 25, 2003, retrieved from the internet http://groups.google.com/groups.
Showing Full Headers of a Message, Nov. 6, 1998, 3 pages, http://www.panix.com/headers.html.
The Penny Black Project, online, retrieved on May 8, 2006, 2 pages, retrieved from the Internet http://research.microsoft.com/research/sv/PennyBlack/.
Tim Richardson, Simple Notes on Internet Security and Email, Jun. 28, 1999, 2 pages, http://www.timrichardson.net/security.html.
Manmatha, A Critical Examination of TDT's Cost Function, 25th ACM SIGIR Conference on R&D in Information Retrieval, 2002, pp. 403-404.
Manning, Foundations of Statistical Natural Language Processing, MIT Press, 1999, pp. 1-23.
Margineantu, Bootstrap methods for the cost-sensitive evaluation of classifiers, ICML-2000, 2000, 8 pgs.
Marvin, Announce: Implementation of E-mail Spam Proposal, News.admin.net-abuse.misc, Aug. 3, 1996, 3 pgs.
Massey, Learning Spam: Simple Techniques for Freely-Available Software, USENIX'2003, 2003, pp. 63-76.
McCallum, A Comparison of Event Models for Naïve Bayes Text Classification, AAAI-98 Workshop on Learning for Text Categorization, 1998, pp. 1-8.
McCallum, Efficient clustering of high-dimensional data sets with application to reference matching, KDD-2000, 2000, 10 pgs.
Mitchell, The Importance of Secretaries, Aug. 4, 1997, 10 pgs.
Mladenic, Feature Selection Using Linear Classifier Weights: Interaction with Classification Models, SIGIR-04, 2004, pp. 234-241.
Mladenic, Feature Selection for Unbalanced Class Distribution and Naïve Bayes, 16th International Conference on Machine Learning, 1999, pp. 258-267.
Morik, Knowledge discovery and knowledge validation in intensive care, Artificial Intelligence in Medicine, vol. 19, 2000, pp. 225-249.
Moschitti, A Study on Optimal Parameter Tuning for Rocchio Text Classifier, ECIR-03, 25th European Conference on Information Retrieval, 2003, pp. 420-435.
Moseley, The Basics of Outlook, Mastering Office 97 Professional Ed., Chapter 33, Microsoft, ISBN 0/7821-1925-5, 1997, pp. 753-763.
Muna, Message to mailing list[lmc-richmond] coordinating schedules = meetings, lists.indymedia.org, Sep. 2001, 1 pg.
Nguyen, PHEmail: Designing a Privacy Honoring Email System, ACM 1-58113-637, CHI'2003, Apr. 2003, pp. 922-928.
O'Grady, A Groupware Environment for Complete Meetings: U. of Calgary, 1994, 3 pgs.
Padwick, Special Edition Using Microsoft Outlook 2000, e-book, May 12, 1999, pp. 1-4.
Padwick, Using Microsoft Outlook 2000, Que Publishing, May 12, 1999, p. 1-93 Pantel, A Spam Classification & Organization Program, AAAI-98, Madison, WI, 1998, 6 pgs.
Platt, Fast training of support vector machines using sequential minimal optimization, Advances in Kernel Methods—Support Vector Learning, MIT Press, 1999, 24 pgs.
Platt, Probabilistic Outputs for Support Vector Machines and Comparisons to Regularized Likelihood Methods, Advances in Large Margin Clasifiers, MIT Press, 1999, 11 pgs.
Plaxo, Product Overview, www.plaxo.com 2002-2004 2pgs.
Provost, Learning with Imbalanced Data Sets 101, AAAI'2000 Workshop on Imbalanced Data Sets, 2000, pp. 1-5.

(56) References Cited

OTHER PUBLICATIONS

Provost, Naive-Bayes vs. Rule-Learning in Classification of Email, Tech. Report, Dept of Computer Sciences, U. of Texas, Austin, TX, 1999, 4 pgs.
Provost, Robust Classification for Imprecise Environments, Machine Learning, vol. 42, 2001, pp. 203-231.
Qualcomm Inc., Eudora MailPro Cersion 3.0 for Windows User Manual, Jun. 1997, 198 pgs.
Redmond, AlterEgo E-Mail Filtering Agent—Using CBR as a Service, AAAI-98, Workshop on Case-Based Reasoning Integrations, Madison, WI, 1998, 9 pgs.
Rennie, An Application of Machine Learning to E-mail Filtering, KDD-2000, Workshop on Text Mining, 2000 6 pgs.
Rennie, Improving Multi-Class Text Classification with Naïve Bayes, Tech. Report ATTR-2001-004, MIT, 2001, 50 pgs.
Rennie, Tackling the Poor Assumptions of Naïve Bayes Text Classifiers, 20th International Conference on Machine Learning, 2003, pp. 1-8.
Rudd, Winning the PC Shell Game, Today's Office, Jan. 1989, 1 pg.
Saerens, Adjusting the Outputs of a Classifier to New a Priori Probabilities: A Simple Procedure, Neural Computation, vol. 14, 2002, pp. 21-41.
Sahami, A Bayesian Approach to Filtering Junk E-mail, AAAI-98, Workshop on Learning for Text Categorization, Madison, WI, 1998, 10 pgs.
Sakkis, Stacking Classifiers for Anti-Spain Filtering of E-Mail, EMNLP-2001, Carnegie Mellon University, 2001, pp. 7.
Salton, A vector-space model for automatic indexing, Communications of the ACM, vol. 18, 1975, 8 pgs.
Sanderson, Duplicate detection in the Reuters collection, Tech. Report TR-1997-5, Dept. of Computing Science, U. of Glasgow, 1997, 11 pgs.
Sarawagi, Interactive Deduplicaiton Using Active Learning, SIGKDD 02 Edmonton, Alberta, Canada, 2002, 839-846.
Schohn, Less is More: Active Learning with Support Vector Machines, ICML-2000, San Francisco, CA, 2000, pp. 839-846.
Segal, MailCat: An Intelligent Assistant for Organizing E-Mail, 3rd Int'l Cong. On Autonomous Agents, 1999, 8 pgs.
Segal, Incremental Learning in SwiftFile, ICML-2000, 2000, 11 pgs.
Sen, AFormal Study of Distributed Meeting Schedulin Group Decision and Negotiation 7:1998 Kluwe Academic Publishers, Printed in Netherlands, pp. 265-289.
Shivakumar, N. and Garcia-Molina, H. (1995) SCAM: A Copy Detection Mechanism for Digital Documents. In: 2nd International Conference in Theory and Practice of Digital Libraries (DL 1995), Jun. 11-13, 1995, Austin, Texas, 13 pgs.
Simpson, RFC 1994: PPP Challenge Handshake Authentication Protocol (CHAP), Network Working Group, Aug. 1996, 13 pgs.
Olsen-Start-up wants your held to fight spam, CNET News.com Review-700XL, msnbc-cnet.com.com/2100-1023-937300.html?tag=rn, Jun. 19, 2002, 5 pgs.
Sutter, Assigning Delegates in Microsoft Outlook, TechRepublic, Sep. 8, 2000, 5 pgs.
Syroid, Outlook 2000 in a Nutshell, O'Reilly Media Inc., May 2, 2000, 7 pgs.
Vapnik, Statistical Learning Theory, Chapter 10, John Wiley, NY, 1998, 24 pgs.
Wahba, Support Vector Machines, Reproducing Kernel Hilbert Spaces and the Randomized GACV 1, Tech Report No. 984rr, Jul. 2, 1998, 23 pgs.
Webb, Adjusted Probability Naïve Bayesian Induction, 11th Australian Joint Conference on Artificial Intelligence, 1998, pp. 1-11.
Weiss, The Effect of Class Distribution on Classifier Learning: An Empirical Study, Tech. Report ML-TR-44, Dept. of Computer Science, Rutgers U., 2002, 27 pgs.
Winkler, The State of Record Linkage and Current Research Problems, Tech. Report, Statistical Research Division, U.S. Bureau of Census, Washington, DC 1999, 15 pgs.
Wu, Refinement Approach to Handling Model Misfit in Text Categorization, ACM SIGKDD International Conference on Knowledge Discovery and Data Mining, 2002, pp. 1-10.
Yang, A Comparative Study on Feature Selection in Text Categorization, ICML'97, 1997, pp. 412-420.
Zadrozny, Learning and making decisions when costs and probabilities are both unknkown, Tech. Report CS2001-0664, U. of California San Diego, 2001, 10 pgs.
Zadrozny, Obtaining Calibrated Probability Estimates from Decision Trees and Naïve Bayesian Classifiers, 18th International Conference on Machine Learning, 2001, pp. 1-8.
Zadrozny, Transforming Classifier Scores Into Accurate Multiclass Probability Estimates, 8th International Conference on Knowledge Discovery and Data Mining, 2002, pp. 1-6.
Zaragoza, Machine Learning and Textual Information Access, Preceeding the Fourth European Conference on Princi les and Practice of Knowledge Discovery in Databases, (PKDD'2000). 1 pg.
Zhang, Probabilistic Score Estimation with Piecewise Logistic Regression, International Conference on Machine Learning, 2004, pp. 1-8.
Plaxo, Update Your Address Book!, 2002-2004, 4 pgs.
Yahoo! Messenger Makes the World a Little Smaller, More Informed, Jun. 21, 1999, pp. 1-2.
Microsoft TechNet, Microsoft Office 2003 Editions Security Whitepaper, Apr. 1, 2003, pp. 1-2.
Parker, Management Team, www.plaxo.com, 2002-2004, 3 pgs.
Plaxo Launches: Makes it Easy to Keep Contact Information, www.plaxo.com, 2002-2004, 2pgs.
Take a Number Systems, Turn-O-Matic, Oct. 25, 2001, 4 pgs.
Slipstick, To add addresses automatically, Jun. 7, 2002, pp. 1-2.
Privacy Recovery with Disposable Email Addresses, IEEE Security Privacy, ISBN 1540-7993/03, 2003, pp. 35-39.
Vipul's Razor, razor.sourceforge.net, Jun. 24, 2002, 23 pgs.
The Big Picture, CNET Neews.com Review—700XL, msnbc-cnet.com.com/2104-10230938103.html, Jun. 24, 2002, 2 pgs.
Yankelovich, Office Monitor, CHI 1996 Conference on Human Factors in Computing Systems, Apr. 14-18, 1996, 2 pgs.
Pavlov, Document Preprocessing for Naïve Bayes Classification and Clustering with Mixture of Multinomials, ACM SIGKDD International Conference on Knowledge Discovery and Data Mining, 2004, pp. 1-6.
Voorhees, The Philosophy of Information Retrieval Evaluation, 2nd Workshop of the Cross-language Evaluation Forum, 2001, pp. 355-370.
Zaragoza, Rhe perception algorithm with uneven margins, ICML 2002, 2002, pp. 379-386.
Zaragoza, Learning to Filter Spam E-Mail: Comparison of a Naïve Bayesian and a Memory-Based Approach, 4th European Conf. on Principles and Practice of Knowledge Discovery in Databases, Lyon, France, Sep. 2000, pp. 1-12.
Admediation: New Horizons in Effecrtive Email Advertising, Communications of the ACM archive, ISSN 0001-0782, vol. 44, iss. 12, Dec. 2001, pp. 91-96.
Prasetijo, A Three-Party HTTP Proxy to Support Internet Content Regulation, Australasian Conference on Information Security and Privacy, 2000, pp. 8 pgs.
Alspector, Final Office Action, U.S. Appl. No. 11/380,375, Jan. 20, 2010, 13 pgs.
Alspector, Office Action, U.S. Appl. No. 10/683,426, Oct. 6, 2008, 16 pgs.
Alspector, Office Action, U.S. Appl. No. 10/683,426, Jun. 8, 2007, 16 pgs.
Alspector, Office Action, U.S. Appl. No. 10/683,426, Mar. 11, 2009, 15 pgs.
Alspector, Office Action, U.S. Appl. No. 10/683,426, Jan. 30, 2007, 17 pgs.
Alspector, Office Action, U.S. Appl. No. 10/740,821, Feb. 24, 2005, 21 pgs.
Alspector, Office Action, U.S. Appl. No. 10/740,821, Jul. 28, 2005, 24 pgs.
Alspector, Office Action, U.S. Appl. No. 11/380,375, Jun. 15, 2009, 13 Pgs.

(56) References Cited

OTHER PUBLICATIONS

Alspector, Office Action, U.S. Appl. No. 11/380,375, Oct. 29, 2008, 14 pgs.
Alspector, Office Action, U.S. Appl. No. 11/380,375, Mar. 31, 2008, 17 pgs.
America Online Inc., International Preliminary Report on Patentability, PCT/US2004/001784, Jul. 29, 2005, 7 pgs.
America Online Inc., International Preliminary Report on Patentability, PCT/US2004/001788, Jul. 29, 2005, 9 pgs.
America Online Inc., International Preliminary Report on Patentability, PCT/US2004/043643, Jul. 3, 2006, 6 pgs.
America Online Inc., International Search Report and Written Opinion, PCT/US2004/001784, Jan. 13, 2005, 8 pgs.
America Online Inc., International Search Report and Written Opinion, PCT/US2004/001788, Mar. 10, 2005, 9 pgs.
America Online Inc., Written Opinion, PCT/US2004/043643, May 26, 2005, 5 pgs.
America Online Inc., International Search Report, PCT/US01/18556, Jun. 5, 2002 2 pgs.
Chiarella, An Analysis of Spam Filters, A Mayor Qualifying Project Report, Worcester Polytechnic Institute, Apr. 2003, 81 pgs.
Androutsopoulos, A Comparison of a Naïve Bayesian and a Memory-Based Approach, KDD'2000, 2000, 12 pgs.
Androutsopoulos, An Evaluation of Naïve Bayesian Anti-Spam Filtering, ECML-2000, 2000, pp. 09-17.
Androutsopoulos, An Experimental Comparison of Naïve Bayesian and Keyword-Based Anti-Spam Filtering with Encrypted Personal E-mail Messages, SIGIR-2000, 2000, pp. 160-167.
Olsen, Anti-spam service battles bugs, Jun. 20, 2002, 3 pgs, msnbc-cnet.com.com.
AOL Instant Messenger Windows Beta Features, AOL Instant Messenger All New Version 2.0, What is AOL Instant Messenger, Quick Tips for Getting Started; Frequently Asked Questions About AOL Instant Messenger, Jun. 24, 1999, 18 pgs.
AOL Technology: turning complicated things into engaging services, 1996 Annual Report, 22 pgs.
Apte, Automated Learning of Decision Rules for Text Categorization, ACM Transactions, vol. 12, No. 3, Jul. 1994, pp. 233-251.
Bee Staff Reports, Governor wants to meet with refugee leaders, Modesto Bee, Mar. 5, 1989, p. 2.
Beitzel, Evaluation of Filtering Current News Search Results, ACM SIGIR Conference on R&D in Information Retrieval, 2004, pp. 1-2.
Bennett, Assessing the Calibration of naïve bayes' posterior estimates, Dept. of Comp. Sci., Carnegie Mellon University, Sep. 12, 2000, pp. 1-10.
Bennett, Probabilistic Combination of Text Classifiers Using Reliability Indicators: Models and Results, 25th ACM SIGIR Conference on R&D in information Retrieval, 2002, pp. 207-214.
Bennett, Using Asymmetric Distributions to Improve Text Classifier Probability Estimates, 26th ACM SIGIR Conference on R&D in Information Retrieval, 2003, pp. 111-118.
Better Bayesian Filtering, www.paulgraham.com/better.html, Jan. 2003, pp. 1-11.
Bott, Special Edition using Microsoft Office 2000, Que Publishing, 1999, p. 772-78.
Bradley, The use of the area under the ROC curve in the evaluation of machine learning algorithms, Patter Recognition, vol. 30, No. 7, 1997, pp. 1145-1159.
Breiman, Bagging predictors, Machine Learning, vol. 24, 1996, pp. 123-140.
Breiman, Out-of-bag estimation, Tech. Report, Dept. of Statistics, UC Berkeley, CA, 1996, 13 pgs.
Brin, Copy detection mechanisms for digital documents, SIGMOD, 1995, pp. 398-409.
Broder, On the resemblance and containment of documents, SEQS: Sequences '91, 1998, 9 pgs.
Broder, Syntactic clustering of the web, www.hpl.hp.com/techreports/Compaq-DEC/SRC-TN-1997-015.pdf, 1997, 13pgs.
Brown, Email with Netscape, Using Netscape 2, Chapter 13, Que Corporation, Jan. 1996, pp. 327-352.
Brown, Support Vector Machine Classification of Microarray Gene Expression Data, Tech. Report, UCSC-CRL-99-09, UC Santa Cruz, 1999, 31 pgs.
Buckley, The smart/empire tipster IR system, TIPSTER Phase III Proceedings, 2000, 15 pgs.
Calabria, Sams Teach Yourself Lotus Notes R5 in 10 Minutes, Sams, Jul. 1999, 27 pgs.
Chowdhury, Collection statistics for fast duplicate document detection, ACM Transactions on Information Systems, vol. 20, No. 2, 2002, pp. 171-191.
Cleverdon, The Significance of the Cranfield tests on Indexing Language, 14th International Conference on R&D in Information Retrieval, 1991, pp. 3-12.
Cloudmark, home products support company, www.cloudmark.com, Jun. 24, 2002, 17 pgs.
Cobb, International Search Report, PCT/US98/17677, Dec. 29, 1998, 2 pgs.
Cohen, Context-Sensitive Learning Methods for Text Categorization, 19th ACM SIGIR Conference on R&D in Information Retrieval, 1996, pp. 307-315.
Cohen, Fast effective rule induction, 12th Int'l Conf. on Machine Learning, 1995, 9 pgs.
Cohen, Instant Messaging, PC Magazine, PC Labs, Apr. 13, 1999, 2 pgs.
Cohen, Learning Rules that Classify E-mail, AAAI Spring Symposium on Machine Learning in Information Access, 1996, 10 pgs.
Cover, Elements of Information Theory, John Wiley & Sons Inc, 1991, pp. 1-8.
Cronen-Townsend, Predicting Query Performance, SIGIR, 2002, pp. 299-306.
Cybozu Office 4 Support, www.share360.com/support/office4/manuals/updates_-_Linux.all.html, printed Apr. 7, 2008, 7pgs.
Diederich, Authorship Attibution with Support Vector Machines, Proc. Of the Learning Workshop, Snowbird, Utah, 2000, 17 pgs.
Domingos, A general method for making classifiers cost-sensitive, KDD'99, ACM Press, 1999, pp. 155-164.
Domingos, Context Sensitive Feature Selection for Lazy Learners, Artificial Intelligence Review, vol. 11, 1997, 25 pgs.
Domingos, On the Optimality of the Simple Bayesian Classifier Under Zero-One Loss, Machine Learning, vol. 29, 1997, pp. 103-130.
Drucker, Support Vector Machines for Spam Categorization, IEEE Transactions on Neural Networks, vol. 10, No. 5, Sep. 1999, pp. 1048-1054.
Dudley, Telstra targets Net spammers, www.news.com.au/common, Dec. 2, 2003, pp. 1-2.
Dumais, Inductive Learning Algorithms and Representaions for Text Categorization, 7th Int'l Conf. on Information and Knowledge Management, 1998, pp. 229-237.
Elkan, The Foundations of Cost-Sensitive Learning, 17th International Joint Conference on Artificial Intelligence, 2001, 6 pgs.
Eyheramendy, On the Naïve Bayes model for text categorization, 9th Int'l Workshop on Artificial Intelligence and Statistics, 2003, 8 pgs.
Fawcett, ROC graphs: notes and practical considerations, Tech. Report HPL-2003-4, HP LBS, 2003 28 pgs.
Fleuret, Fast Binary Feature Selection with Conditional Mutual Information, Journal of Machine Learning Research 5, 2004, pp. 1531-1555.
Forman, An Extensive Empirical Study of Feature Selection Metrics for Text Classification, J. Machine Learning Research 3, 2003, pp. 1290-1305.
Friedman, Bayesian Network Classifiers, Machine Learning, vol. 29, 1997, pp. 131-163.
FTC prepares to bust spammers, msnbc-cnet.com.com/2100-1023-834044.html?tag=bp1st, Feb. 11, 2002, 2 pgs.
Garrido, Cognitive Modeling and Group Adaptation in Intelligent Multi-Agent Meeting Scheduling 1996 18 pgs.
Garrido, Multi-Agent Meeting Scheduling: Preliminary Experimental Results, 1996, 8pgs.
Gavin, How to Advertise Responsibly Using E-Mail and Newsgroups or—how NOT to MAKE ENEMIES FAST!, ftp.rfc-editor.org/in-notes/fyi/fyi28.txt, Nov. 7, 2002, pp. 1-27.

(56) References Cited

OTHER PUBLICATIONS

Graham, A Plan for Spam, www.paulgraham.com/spam.html, 2002, pp. 1-15.
Habeas, Habeas Frequently Asked Questions, Oct. 3, 2002, 9 pgs.
Hall, A Countermeasure to Duplicate-detecting Antipspam Techniques, Tech. Report 99.9.1, AT&T Labs, 1999, 54 pgs.
Hammami, WebGuard: Web based Adult Content Detection and Filtering System, IEEE 0/7695-1932, WI'03, Jun. 2003, pp. 1-5.
Han, Centroid-Based Document Classification: Analysis and Experimental Results, Principles of Data Mining and Knowledge Discovery, 2000, pp. 424-431.
Harmon, Overview of the First Text Retrieval Conference (TREC-1), Computer Systems and Technology, National Institute of Technology and Standards, 1992, 12pgs.
Haynes et al., Satisfying User Preferences While Negotiating Meetings; Dept. of Mathematics & Computer Sciences, U. of Tulsa, 1996—1pg.
Hearst, Support Vector Machines, IEEE Intelligent Systems, Jul./Aug. 1998, 10 pgs.
Heintze, Scalable document fingerprinting, USENIX Workshop on Electronic Commerce, Nov. 1996, 10 pgs.
Hidalgo, Combining Text and heuristics for Cost-Sensitive Spam Filtering, CoNLL-2000, Lisbon, Portugal, 2000, 4 pgs.
Hird, Technical Solutions for Controlling Spam, Proc. AUUG2002, Melbourne, Australia, Sep. 4-6, 2002, 17 pgs.
Hoad, Methods for identifying versioned and plagiarized documents, J. American Society for Information Science and Technology, 2002, 13 pgs.
Hu, Yahoo adds spam filter to email, but will it work?, downloaded Feb. 23, 2015, 4pgs.
Hansell, Internet is Losing Ground in the Battle Against Spam, The New York Times, NyTimes.com, Apr. 2003, pp. 1-4.
Joachims, Text Categorization with Support Vector Machines: Learning with Many Relevant Features, ECML'98, 1998, pp. 137-142.
Job Description, Graduate Division, Execute Assistant in the Dean of Graduate Studies, May 7, 1994, 2 pgs.
Johnson, Method for Automatic Meeting Update upon Requester's Anticipated Change of Expected Attendees, IBM Technical Disclosure Bulletin, Jan. 1994, 3 pgs.
Katirai, Filtering Junk E-mail: A performance comparison between genetic programming and naïve Bayes, Tech. Report presented at Fall 1999 Mtng of the CMU Text Learning Group, Dept. of Elect/Computer Engineering U. of Waterloo, Nov. 1999, 27 pgs.
Kangasharju, Secure and Resilient Peer-to-Peer Email: Design and Implementation, IEEE 0/7695-203, P2P'03, May 2003, pp. 1-8.
Kohavi, Wrappers for Feature Subset Selection, Artificial Intelligence, 1997, pp. 273-324.
Kleinberg, Bursty and hierarchical structure in streams, KDD-Workshop on Temporal Data Mining, 2001, 25 pgs.
Kolcz, Improved Naïve Bayes for Extreme Misclassification Costs, High Precision/Recall, abstract, Feb. 18, 2005, 13 pgs.
Kolcz, Improved Naïve Bayes for Extreme Misclassification Costs, High Precision/Recall, abstract, May 2005, 18pgs.
Kolcz, Local Scarcity Control for Naïve Bayes with Extreme Misclassification Costs, Feb. 28, 2005, 10 pgs.
Kolcz, SVM-based Filtering of E-mail Spam with Content-specific Misclassification Costs, TextDM'2001, San Jose, CA, 2001, 14 pgs.
Koller, Toward Optional Feature Selection, International Conference on Machine Learning, 1996, 15 pgs.
Kukar, Transductive Reliability Estimation for Medical Diagnosis, Artificial Intelligence in Medicine, vol. 29, 2003, pp. 81-106.
Lewis, A New Benchmark Collection for Text Categorization Research, J. Machine Learning Research, bol. 5, 2004, pp. 361-397.
Lewis, Naïve (Bayes) at forty, the independence assumption in information retrieval, ECML-1998, 1998, 12 pgs.
Lewis, Training Algorithms for Linear Text Classifiers, SIGIR-96, 19th ACM International Conference on Research and Development in Information Retrieval, 1996, 9 pgs.
Li, The perception algorithm with uneven margins, ICML 2002, 2002, 8pgs.
Lin, Formulations of support vector machines: A note from an optimization point of view, Neural Computation, vol. 13, 2001, pp. 307-317.
Liu, Meeting Runner: AnAutomatic Email-Based Meeting Scheduler, BCL Computers Inc., 2002, 7 pgs.
US 5,749,074, 05/1998, Kasso et al. (withdrawn)

* cited by examiner

MANAGING ELECTRONIC MESSAGES

CROSS-REFERENCE TO RELATED APPLICATIONS

This application is a continuation of U.S. patent application Ser. No. 12/537,068, filed Aug. 6, 2009 now U.S. Pat. No. 8,073,916 (now allowed), which is a divisional of U.S. patent application Ser. No. 10/841,767, filed May 7, 2004 (now U.S. Pat. No. 7,590,695), which claims priority to and the benefit of U.S. Provisional Patent Application Ser. No. 60/469,199, entitled AUTOMATED TECHNIQUES FOR CONFIRMING THE SENDER OF AN ELECTRONIC MESSAGE, which was filed on May 9, 2003. The foregoing patent applications are hereby incorporated herein by reference in their entirety.

BACKGROUND OF THE INVENTION

1. The Field of the Invention

The present invention relates generally to electronic messaging. More specifically, the present invention relates to systems and methods for managing the delivery of electronic messages.

2. Related Technology

Many people and businesses have found electronic messaging, such as emailing and instant messaging, a convenient method of communication because sending and receiving electronic messages can be easy.

Unfortunately, the ease with which electronic messages may be generated and sent has led to the development of unsolicited bulk electronic messages, better known as "spam." Unsolicited electronic messages come from a large spectrum of different sources and often include commercial advertisements, political messaging, and other undesirable content including pornographic solicitations.

To many users, it seems that the number of unsolicited messages that they receive increases daily. Receiving unsolicited electronic messages is frustrating for many users because they must sort through each electronic message they receive. If they do not sort through their messages regularly, the number of unsolicited electronic messages may soon outnumber the desired electronic messages and make it difficult for a user to find certain electronic messages. Users are understandably frustrated that they must waste time sorting through unsolicited electronic messages that they receive daily. Even if simply deleting the unsolicited electronic messages, users can waste significant amounts of time.

Once started, this flood of unsolicited electronic messages is difficult to stop. Senders of bulk unsolicited electronic messages are difficult to track down because they typically fabricate a sender's electronic address or refrain from including a sender's electronic address altogether. Also, because a bulk address list (depending on how large it is) can be a valuable commodity for use or for sale, holders of bulk address lists typically refuse to remove any address from a list, which would reduce the value of the list. Accordingly, persons that receive bulk unsolicited electronic messages are often unable to successfully request that their address be removed from a bulk address list.

With good reason, users have become wary of giving out their electronic addresses for fear that their electronic addresses will wind up in the hands of those who send unsolicited electronic messages.

For these reasons, users need a way to successfully prevent unwanted or unsolicited electronic messages from being delivered. Some attempts have been made to allow users to filter out unwanted and/or unsolicited electronic messages.

One method allows a recipient to block a sender's e-mail address by adding the sender's e-mail address to the recipient's list of unauthorized senders. However, this method falls short because the sender simply may fabricate a different e-mail address to circumvent the block. Further, before any e-mail from the sender is blocked, the recipient must view an e-mail from the sender, determine that it is unsolicited, and manually add the sender's e-mail address to the recipient's list of unauthorized senders.

Another method filters e-mail that includes certain words or phrases. For example, a recipient that frequently receives unsolicited offers for mortgage loans may add the phrase "mortgage rate" into a filtering component of the recipient's e-mail program. Subsequent e-mail that contains the phrase "mortgage rate" is filtered into a delete or trash folder.

However, this filtering method is flawed for many reasons. First, many unsolicited e-mail do not contain the filtered words and are thus delivered to the recipient. Second, some desired e-mail, which the recipient expects or wants to receive, may include the filtered words and thus may be filtered out. Accordingly, even if the filtering system correctly filters some unsolicited e-mail, the recipient must nevertheless review the entire set of filtered e-mail to determine whether any desired e-mail has been filtered out. Third, not only must the recipient spend time double-checking for erroneously filtered e-mail, but the recipient may also spend a significant amount of time setting up and maintaining the filtering system. Fourth, even if a recipient had the time to maintain the filters, many recipients lack the technical knowledge to be capable of (or to be comfortable with) managing this type of filtering system.

BRIEF SUMMARY OF THE INVENTION

A need therefore exists for systems and methods that reduce some of the above-described disadvantages and problems, reduce all of the above-described disadvantages and problems, and/or reduce other disadvantages and problems.

In some embodiments of the present invention, methods and systems for processing electronic messages are provided. In one aspect of an embodiment of the invention, a system may determine whether a sender of an incoming electronic message is authorized to send messages to one or more recipients.

For example, in response to receiving an electronic message, a system may send one or more challenge messages to a sender of the electronic message. The challenge message may request one or more responses from the sender, from a software program associated with the sender or any other suitable response in any suitable form. If the system receives a satisfactory response, the system may deliver the electronic message to one or more intended recipients. If the system does not receive a satisfactory response, the system may delete or otherwise process the electronic message.

In one aspect of an embodiment, in response to receiving an electronic message, a system may send one or more challenge messages to a sender of the electronic message. The challenge messages may request one or more responses from a system associated with the sender. The challenge messages may be configured to request a response that will require the sender system to spend a certain amount of time, computing resources, or the like to properly respond to the challenge messages. Thus, because many bulk electronic messaging systems must use their limited resources for sending messages or other uses, the challenge messages may be designed to request a response that is impractical for a typical bulk electronic messaging system to provide. Accordingly, many bulk electronic messaging systems will not properly respond, and the bulk electronic message may not be delivered to the intended recipient.

In one aspect of an embodiment, in response to receiving an electronic message, a system may send one or more challenge messages to a sender of the electronic message. The challenge messages may request two or more responses from a sender system. The challenge messages may request that a requested time period elapse between the responses, or that the responses occur at requested intervals, or both. The requested time period, the requested intervals, or both may be configured to request a response that requires the sender system to spend a certain amount of time, computing resources, or the like to properly respond. The challenge messages may be configured to request a response that may be performed by a person (such as personally or manually), but that may be impractical for a typical bulk messaging system to perform.

The activity of a sender system may be monitored. For example, activity such as keystrokes, mouse activity, user-interface activity, or the like may be monitored. The activity of a sender system may be associated with an electronic message. A system may determine whether the associated monitored activity is consistent with a bulk messaging system, a sender of bulk messages, and/or a valid sender. If the activity is consistent with a valid sender, the electronic message may be delivered to the intended recipient. If the activity is not consistent with a valid sender and/or if the activity is consistent with the activity of a bulk messaging system or a sender of bulk messages, the electronic message may be deleted or otherwise processed.

In one aspect of an embodiment, an authentication certificate may be associated with an electronic message. For example, in one embodiment, the authentication certificate may be a digital key that may be attached to an electronic message. A set of messaging rights may be associated with the authentication certificate. Accordingly, a sender may obtain an authentication certificate to use with one or more electronic messages. In response to receiving an electronic message, a system associated with the intended recipient may be configured to determine an authentication certificate permits the electronic message to be delivered. If the authentication certificate permits the electronic message to be delivered, the electronic message may be delivered to the intended recipient. If the authentication certificate does not permit the electronic message to be delivered, the electronic message may be deleted or otherwise processed.

In one aspect of an embodiment, one or more various challenge-response protocols are provided. The challenge-response protocols may vary according to the responses requested, such as the time, resources, and/or effort necessary for a proper response. A system may determine a value representing how consistent an electronic message is with a message from a bulk messaging system, a sender of bulk messages, and/or a valid sender. Based at least in part upon that value, the system may initiate a less intrusive challenge-response protocol, initiate a more intrusive challenge-response protocol, deliver the electronic message, delete the electronic message, or otherwise process the electronic message.

For purposes of summarizing, some aspects, advantages, and novel features have been described. Of course, it is to be understood that not necessarily all such aspects, advantages, or features will be embodied in any particular embodiment of the invention. Further, embodiments of the invention may comprise aspects, advantages, or features other than those that have been described.

Some aspects, advantages, or features of embodiments of the invention may become more fully apparent from the following description and appended claims or may be learned by the practice of embodiments of the invention as set forth in this disclosure.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. Certain embodiments of the invention will be described and explained with additional specificity and detail through the use of the accompanying drawings in which.

DETAILED DESCRIPTION OF THE PREFERRED EMBODIMENTS

As used in the context of this disclosure, the terms "electronic messaging" and "electronic messages" are broad terms, and are used in their ordinary meaning, and include any form of sending a message electronically including, but not limited to, e-mail; instant messaging; telephone; voicemail; facsimile; paging; mobile phone text messaging; forms of electronic communication that use a recipient identifier (such as, recipient's address); forms of electronic communication that use a sender identifier (such as, a sender's address); forms of electronic communication that use a sender identifier and a recipient identifier; forms of electronic communication that use do not use a sender identifier nor a recipient identifier; or the like. For sake of simplicity, the following overview of electronic messaging is described in the context of e-mail sent over the Internet.

As used in the context of this disclosure, the term "unsolicited" refers to any electronic message that is not desired by a recipient. Certain embodiments of the present invention may provide various parameters that may indicate that an electronic message is undesired. These parameters may be defined in any suitable manner including, but not limited to, by a system, by a person (such as, a recipient, a system user, a system administrator, or the like), or both by a system and by a person. Therefore, an unsolicited message is any unwanted message that is filtered out according to the defined parameters. In contrast, the term "personal electronic messages" refers to electronic messages that are typically generated manually by a sender (rather than automatically by a machine) and are likely to be sent by valid senders (rather than being sent by mass e-mailers or others who send large volumes of unsolicited electronic messages).

Figure 1A:
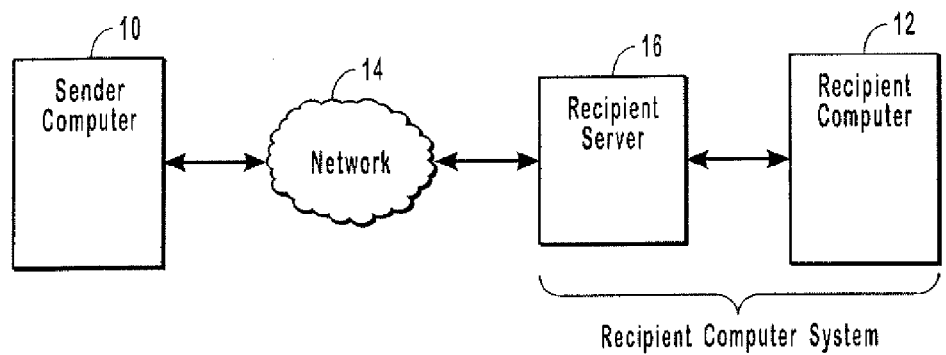
FIG. 1A illustrates an exemplary embodiment of a network environment that includes a sender computer, a recipient server, and a recipient computer that may be used in an embodiment of the invention.

A brief review of the operation of an embodiment of an electronic mailing system over the Internet is provided as follows. Generally, as shown in FIG. 1A, a sender computer 10 (such as, a computer associated with a sender) may send an e-mail to a recipient computer 12 (such as, a computer associated with a recipient). The e-mail may be routed through one or more simple mail transfer protocol (SMTP) servers in network 14 (such as, the Internet) before arriving at a server 16 associated with the recipient computer 12. The server 16, also referred to herein as a "recipient server," may be one or more of a server residing on a local area network with the recipient computer 12, a server that the recipient computer 12 accesses via a modem pool or with another Internet connection, a web server that provides web-based electronic messaging services to the recipient computer 12, a server that operates with the recipient computer 12 in any other suitable network configuration, or any other suitable computing device. The server 16 may provide messaging services for one or more recipients. In one embodiment, the server 16 may be implemented using a set of related servers that provide messaging services for a large number of subscribers in a web-based electronic messaging system. Of course, the server 16 may be implemented in any suitable fashion and with any suitable number of components.

Any process, feature, or function described in this disclosure may be performed by the server 16, by the recipient computer 12, the sender computer 10, any other suitable computing devices, or any suitable combination thereof. The server 16, the recipient computer 12, or any other computing devices associated with the recipient are referred to herein collectively as the "recipient computer system."

Figure 2:
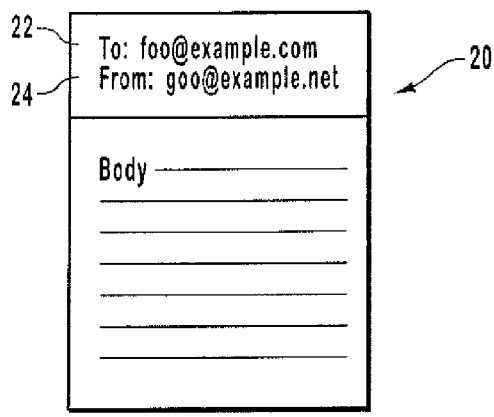
FIG. 2 illustrates selected portions of an exemplary embodiment of an electronic message.

FIG. 2 illustrates an exemplary embodiment of an electronic message 20 that may be created by a sender. To initiate transmission of the electronic message 20 to the recipient, the sender may address the electronic message 20 using the recipient's e-mail address, which may be input manually, automatically, or in any other suitable manner. Such recipients may be direct recipients (often designated in a "to:" field 22), indirect recipients (often designated in "cc:", or carbon copy fields or "bcc:", or blind carbon copy fields), or any other suitable type of recipient. Recipient's e-mail addresses may be obtained by the sender in any of a variety of manners. Senders of unwanted e-mail often obtain the recipient's e-mail address from bulk mailing lists. An e-mail address of the sender may be included in a "from:" field 24. Mass e-mailers or senders of unsolicited electronic messages typically hide their identities by including a false address in the "from" field 24 or otherwise preventing the actual sender's address from appearing in the e-mail.

Figure 1B:
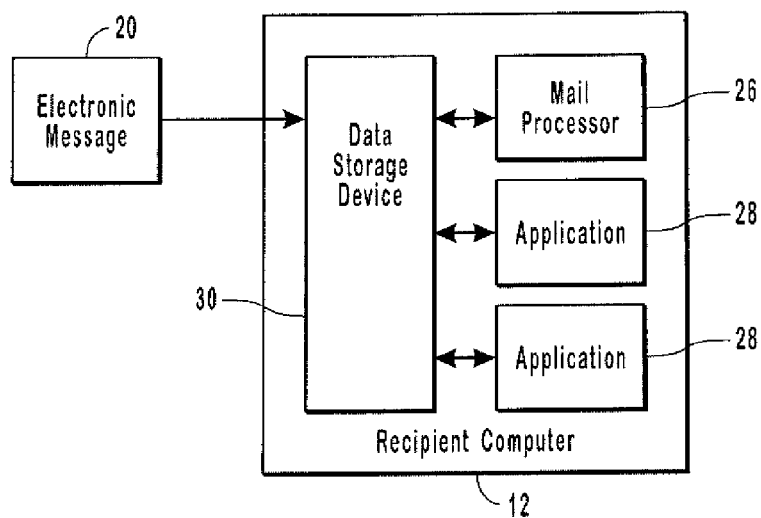
FIG. 1B shows a recipient computer having an electronic messaging application according to an embodiment of the invention.

As shown in FIG. 1B, the electronic message 20 may arrive at the recipient computer 12. The recipient computer 12 may comprise any suitable hardware, software, or the like. In one embodiment, the recipient's computer includes a data storage device 30, a mail processor 26 (such as an application that may process the electronic message 20), and one or more applications 28 (such as a calendaring program, a contacts program, or the like). The data storage device 30 may store data used by the mail processor 26, by the applications 28, or both. A software package may combine the mail processor 26 with the applications 28 to perform mail processing, other data management functions, or any other suitable function.

In one embodiment, a challenge-response method and/or system is provided. For example, in response to receiving the electronic message 20, the recipient computer system may send one or more challenge messages to a sender of the electronic message 20. The challenge messages may request one or more responses from the sender, from a software program associated with the sender, from a computer or other computing device associated with the sender, or any other suitable response in any suitable form. If the recipient computer system receives a satisfactory response, the recipient computer system may deliver the electronic message 20 to one or more intended recipients. If the recipient computer system does not receive a satisfactory response, the recipient computer system may delete the electronic message 20 or otherwise process the e-mail 20. Any of a variety of other challenge-response protocols and/or systems may be used. Exemplary embodiments of some challenge-response protocols and/or systems are described in U.S. Pat. No. 6,199,102; U.S. Pat. No. 6,112,227; and U.S. patent application Ser. No. 10/174,561, filed Jun. 18, 2002, each of which is hereby incorporated herein by reference.

1. System Responses to Challenge Messages

In one embodiment, in response to receiving an electronic message, the recipient computer system may send one or more challenge messages to a "sender system," which may include one or more computers, one or more software programs, one or more computing devices, or the like that may be associated with the sender, the electronic message, or both. The challenge messages may request one or more responses from the sender system.

The challenge messages may be configured and/or sent in a manner that requires the sender system to spend a certain amount of time, computing resources, or the like to properly respond to the challenge messages. For example, the challenge messages may be configured to request that the sender system provide a set of one or more responses and that the set of responses be completed after an amount of time has elapsed. In one embodiment, the challenge messages may request that sender system provide responses that are separated from each other by a requested interval or greater. In one embodiment, challenge messages may be sent at one or more intervals.

Because many bulk electronic messaging systems use their limited resources for sending messages or other uses, a challenge message may be configured and/or sent in a manner to request a response that is impractical for a typical bulk electronic messaging system to provide. Accordingly, many bulk electronic messaging systems will not properly respond, and many bulk electronic messages may not be delivered to the intended recipient.

Figure 3:
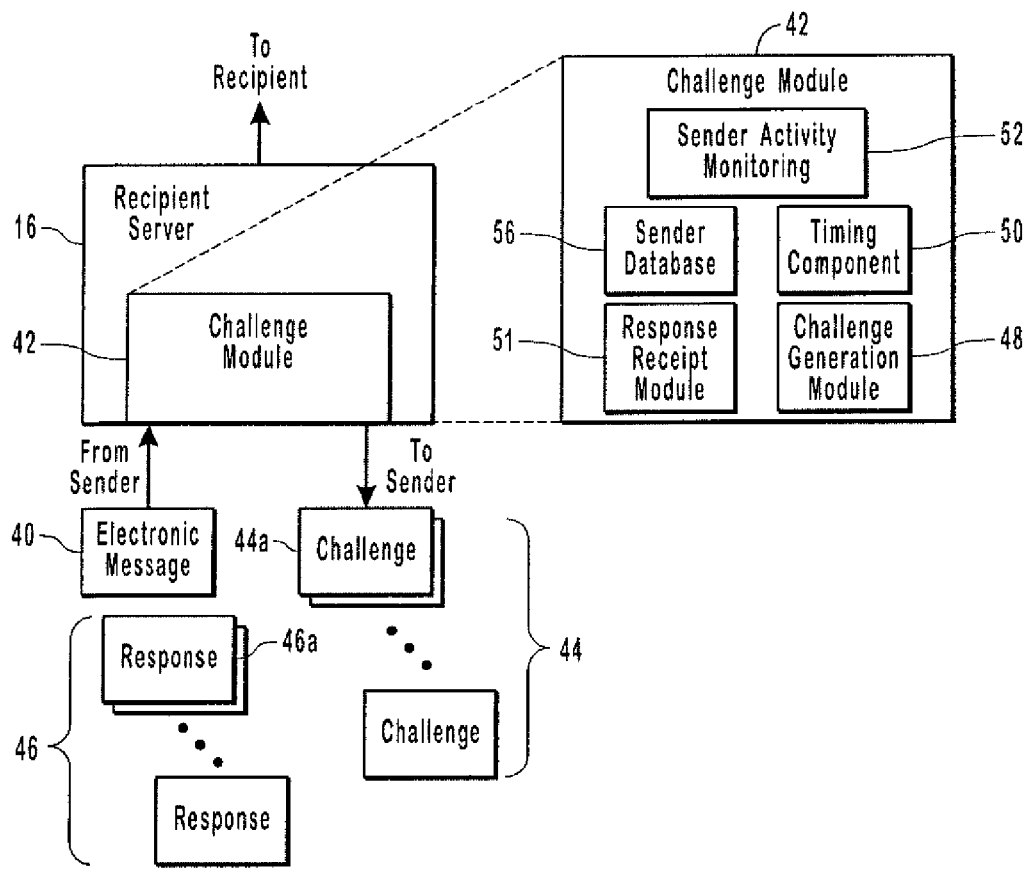
FIG. 3 depicts an exemplary embodiment of a recipient server and components thereof that may be used to issue challenges.

FIG. 3 is a block diagram of an exemplary embodiment of a recipient server 16 that may receive an electronic message 40 from a sender. In response to the receipt of the incoming electronic message 40 from the sender, a challenge generation module 48 of a challenge module 42 of the recipient server 16 may determine whether the sender is designated in a sender database 56 as being authorized (or unauthorized) to send electronic messages to the recipient. If the sender is designated as being authorized, the electronic message 40 may be delivered to the recipient. If the sender is designated as being unauthorized, the electronic message 40 may be deleted or may be otherwise processed. A sender may be designated as authorized, unauthorized, or any other suitable designation. Further, a sender may have a single designation for one or more recipients, may have a plurality of designations for a plurality of recipients, and may have different designations among a plurality of recipients. Thus, authorization may be assessed for a single recipient or a plurality of recipients.

If the sender database 56 does not designate the sender as being either authorized or unauthorized for the recipient, the challenge module 42 may begin a challenge process to determine whether to designate the sender as being authorized, unauthorized, or any other suitable designation.

As shown in FIG. 3, the challenge module 42 may generate a first challenge message 44a of a series of challenge messages 44. Of course, while FIG. 3 illustrates the recipient server 16 generating the challenge messages 44, the challenge module 42 or components thereof may reside among any suitable combination of the recipient server 16, the recipient computer 12, other suitable computing devices, or the like. Thus, the process of generating and sending the challenge messages 44 (and receiving responses thereto) may be performed at any suitable location. Also, the recipient server 16 may be implemented using one or more servers that may advantageously operate together to provide electronic messaging services. Accordingly, the challenge module 42, any component of the challenge module 42, and any functionality thereof may be in distributed over one or more servers.

The challenge messages 44 may be configured to test whether the sender has a computer that can spend a period of time in responding to the series of challenge messages 44. For example, the challenge module 42 may include a timing component 50. The timing component 50 may establish (or otherwise control, edit, adjust, administer, or the like) the timing requirements for a proper responses 46. In one embodiment, the timing requirements may be used to define the period of time a sender computer must spend in providing a proper response to the series of challenge messages 44.

Figure 4:
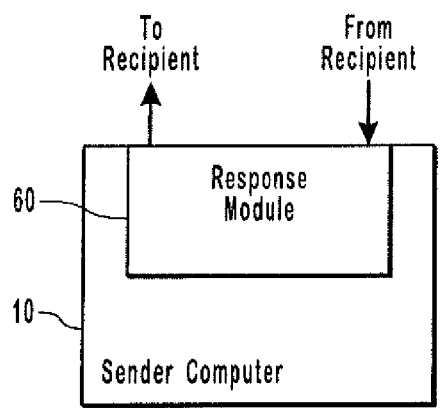
FIG. 4 illustrates an exemplary embodiment of a sender computer and components thereof.

FIG. 4 is a block diagram of an exemplary embodiment of a sender computer 10 that may respond to the one or more challenge messages 44. The sender computer 10 may comprise one or more computers, one or more software programs, one or more computing devices, or the like. The sender computer may, for example, be associated with a sender, the electronic message, or both. As the sender computer 10 transmits one or more responses 46, the response receipt module 54 of challenge module 42 may receive the responses. If the series of responses 46 is correct and the required amount of time has elapsed, challenge module 42 may determine that the sender is authorized. Accordingly, the electronic message 40 may be delivered to the recipient. In addition, the sender database 56 may be updated to designate the sender as being authorized for future electronic messages. The sender may be designated as being authorized for all future electronic messages, as being authorized for a period of time, as being authorized for a number of messages, and/or as being authorized for a number of messages per unit of time (such as, for example, 10 messages a day.

The sender computer 10 may include a response module 60 that may generate one or more responses 46 in response to one or more challenge messages 44. The response module 60 may automatically generate one or more responses 46. Accordingly, the response module 60 may facilitate the automatic authorization of the senders to send personal electronic messages to recipients. This may be attractive to senders of personal electronic messages. The response module 60 may comprise software, other computer-executable instructions, or the like. In one embodiment, the response module 60 may be incorporated into an e-mail application or another messaging application at the sender computer 10. In one embodiment, the response module 60 may be sent with a challenge message 44. In one embodiment, the response module 60 may be installed on sender computer 10. In one embodiment, the response module 60 may be installed on hardware accessible by the sender computer 10. Of course, the sender computer 10 may be configured to respond to one or more challenge messages 44 in any other suitable manner, with or without the response module 60.

The challenge messages 44 may comprise any of a variety of instructions, puzzles, or other information that can cause a properly configured sender computer 10 to perform actions that result in the generation of correct responses 46. For example, a challenge message 44 may include a string of bytes, and a correct response 46 may be the same string of bytes or a transformation thereof. A challenge message 44 may include instructions for causing a properly configured sender computer to access a web page or another Internet resource. The web page or another Internet resource may be operated by an entity associated with the recipient. The access of the web page or another Internet resource may comprise the response 46 and may indicate to the challenge module 42 that the sender computer has responded correctly to the challenge message 44.

Figure 5:
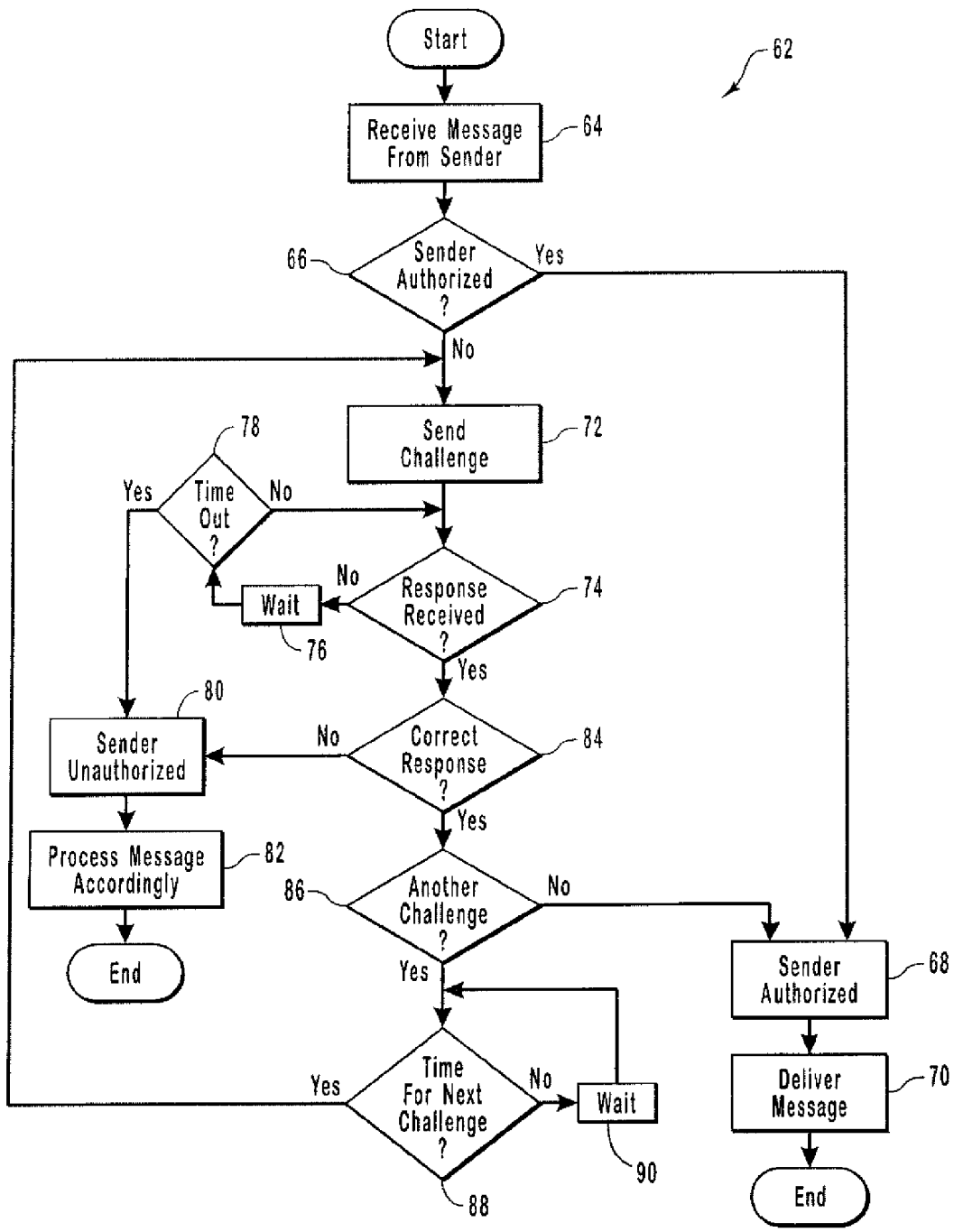
FIG. 5 is a flow diagram depicting an exemplary embodiment of a method by which one or more challenges may be issued with one or more optional timing features.

FIG. 5 is a flow chart of a method of an exemplary embodiment, illustrating a timing-related method 62. At a block 64, an electronic message may be received. At a block 66, the method 62 may determine if the sender of the electronic message is designated as authorized. For example, in one embodiment, a data structure is provided (as in U.S. patent application Ser. No. 10/174,561, filed Jun. 18, 2002) in which a data structure may advantageously used to track one or more statuses (such as authorized, unauthorized, unconfirmed, or the like) for a sender.

As shown in FIG. 5, if the sender is designated as authorized, the method 62 may keep the designation at a block 68 and may deliver the electronic message (or otherwise process the electronic message) at a block 70. If the sender is not designated as authorized, the method 62 may send a challenge message, request, or the like to the sender at a block 72.

As shown in FIG. 5, the method 62 may determine at a block 74 if a response to the challenge message has been received. If the response has not been received, the method 62 may wait at a block 76 for a time period. After the waiting time period has elapsed, the method 62 may determine at a block 78 whether the method 62 should "time out"; for example, in one embodiment, if a time-out period has passed and a response has not been received, the method 62 may stop waiting to receive the response and simply designate the sender as "unauthorized" at a block 80 and process the message accordingly (such as deleting, placing in a designated location, or the like) at a block 82. If the time-out period has not elapsed at a block 78, the method 62 may continue to the block 74.

As shown in FIG. 5, if a response to the challenge message has been received at the block 74, the method 62 may determine whether the response is a correct or acceptable response at a block 84. If the response is not correct, the method 62 may designate the sender as "unauthorized" at the block 80 and process the message accordingly at the block 82. If the response is correct, the method 62 may determine whether another challenge should be issued at a block 86. For example, in one embodiment, two or more challenges may be sent in response to receiving an electronic message.

As shown in FIG. 5, if another challenge need not be sent at the block 86, the method 62 designate the sender as "authorized" at the block 68 and may deliver the electronic message (or otherwise process the electronic message) at the block 70. If another challenge should be sent, the method 62 may determine whether it is an appropriate time to send another challenge message. For example, in one embodiment, two or more challenge messages may be sent in a delayed fashion. Accordingly, if it is not time for the next challenge, the method 62 may proceed to a block 90, wait a period of time, and then return to the block 88. If it is time for the next challenge, the method 62 may proceed to the block 72. It will be appreciated that some of the various steps illustrated in FIG. 5 are optional. Further, no particular order is necessary. Further, some or all of the illustrated steps may be used in combination with any other suitable process.

As mentioned above, in one embodiment, timing requirements may be used to define the period of time the sender computer 10 must spend in providing a proper response 46 to the series of challenge messages 44. The timing requirements may specify that the challenge module 42 should receive a valid set of responses 46 over a period of time not less than a specified number of seconds after an event, such as the receipt of the electronic message 40. The timing requirements may specify that the challenge module 42 should receive at least one response after an amount of time has passed since an event. Alternatively, the timing requirements may specify that the challenge module 42 should receive at least two of a set of two or more responses after an amount of time has passed since an event. In one embodiment, the timing requirements may specify that the challenge module 42 receive each of a set of one or more responses after an amount of time has passed since an event. In one embodiment, the timing requirements may specify that a response 46a cannot be received sooner than a specified amount of time after a corresponding challenge message 44a has been sent. Of course, the timing requirements may measure elapsed time with respect to any suitable event, including, but not limited to, the receipt of the electronic message 40, the transmission of the first challenge message 44a, or any other suitable events. Further, the timing requirements may specify that any suitable number of one or more responses must be received in any number of suitable fashions, after any suitable time has elapsed, and after any suitable events.

In one embodiment, the timing requirements specify that each response in the series 46 must be separated from one another by not less than a specified amount of time (such as, seconds). The timing requirements may specify that each response in the series 46 be received by the challenge module 42 in intervals greater than or equal to a specified amount of time.

The timing requirements may permit the sender computer 10 to take an amount of time much longer than the specified period, which may accommodate a sender computer that is powered down for an extended time after the initial electronic message 40 is sent. The number of challenge messages 44 can be any suitable number. The period of time specified by the timing component 50 can be any suitable length. However, the period of time may be advantageously short enough not to unduly delay the delivery of authorized electronic messages.

In one embodiment, the challenge module 42 may delay sending one or more successive challenge messages 44 so as to effectively tie up the sender computer 10 for an amount of time. In one embodiment, the sender computer may be required to wait after receiving a challenge message 44a rather than immediately sending the corresponding response 46a.

In one embodiment, challenge module 42 may include a sender activity monitoring module 52. In some situations, the sender activity monitoring module 52 may hinder a sender from simultaneously responding to large numbers of challenge messages for a large number of different electronic messages. The sender activity monitoring module 52 may monitor and limit the number of confirmations or responses in process at any one time from a given IP address, a given range of IP addresses, a given domain, or the like. The sender activity monitoring module 52 may monitor and limit the number of confirmations in process from any single sender, for any particular recipient, or both.

In one embodiment, although the challenge module 42 sends one or more challenge messages requesting one or more responses from the sender computer 10, the sender may respond manually, personally or the like. For example, when a sender computer 10 is not configured to respond automatically, the challenge module 42 may send one or more challenge messages to the sender, according to any suitable challenge-response protocol including but not limited to those described in this disclosure and those described in U.S. Pat. No. 6,199,102; U.S. Pat. No. 6,112,227; and U.S. patent application Ser. No. 10/174,561, filed Jun. 18, 2002.

2. Personal Responses to Challenge Messages

In one embodiment, in response to receiving an electronic message, a system may send a one or more challenge messages to a sender of the electronic message. The challenge messages may request one or more responses from the sender. The challenge messages may be configured to request a response that may be performed by a person (such as personally or manually), but that may be impractical for a typical bulk messaging system to perform.

In one embodiment, the challenge message may request that the responses are performed after a requested time period has elapsed, at requested intervals, or both. In one embodiment, the recipient computer system may select (control, edit, administer or the like) the requested time period, the requested intervals, or both. The requested time period, the requested intervals, or both may be configured to request a response that will require the sender to spend a certain amount of time to properly respond. Thus, because senders of bulk electronic messages have limited time, a challenge message may be designed to request a response that is impractical for a sender of a bulk electronic message to personally respond. Accordingly, many senders of bulk electronic messages will not properly respond, and the bulk electronic message may not be delivered to the intended recipient.

In one embodiment, the sender may receive a challenge message with instructions for response. The challenge message may be in any suitable form, such as an electronic message. In one embodiment, a correct response to a challenge message may comprise selecting a link to a web page or another Internet resource. In one embodiment, a correct response to a challenge message may comprise solving a puzzle. In one embodiment, a correct response to a challenge message may comprise identifying and inputting information from a graphical image. In one embodiment, a correct response to a challenge message may comprise performing an action that can be detected by the challenge module 42 of the recipient server 16.

In one embodiment, the sender may receive a challenge e-mail message. In one embodiment, a correct response to a challenge e-mail message may comprise the sender selecting a first link included in the challenge e-mail message, waiting a certain amount of time (such as, a number of seconds), and then selecting a second link included in the challenge e-mail message.

In one embodiment, a correct response to a challenge message may comprise using a graphical puzzle, such as those that are described in U.S. Provisional Patent Application Ser. No. 60/469,489, filed on May 9, 2003, entitled "Authorizing Delivery of Electronic Messages by Preventing Machine Recognition and Interpretation of Confirmation Codes,"

which is hereby incorporated herein by reference. In one embodiment, a correct response to a challenge message may comprise using any other suitable puzzle, including those that may be developed in the future.

In one embodiment, the challenge message may include entertainment or information to engage the sender's attention during a waiting period.

In one embodiment, the recipient computer system may determine whether some or all of the steps performed by a sender come from a particular IP address, a particular computer, or the like using any suitable method including but not limited to cookies. In one embodiment, the recipient computer may verify that an IP addresses has only one outstanding challenge message at a time. In one embodiment, the recipient computer may verify that an IP addresses has less than a certain limit of outstanding challenge messages at a time. For example, in some situations, an IP address for a well-known proxy may have a higher limit allowed for challenge messages.

In some embodiments, the process of obtaining manual, or personal, responses 46 to challenge messages 44 may be similar to the methods of obtaining responses as described above in reference to FIGS. 3 and 4. In one embodiment, a sender may determine whether the sender will use a response module (such as response module 60) that will respond automatically to one or more challenge messages 44 or whether the sender will respond personally to challenge messages 44. In a further embodiment, the senders can make these decisions on how to respond for particular recipients and recipient domains and the conditions under which systematic or personal responses are to be made.

In some embodiments, the process of obtaining manual, or personal, responses 46 to challenge messages 44 may use any suitable challenge-response protocol including but not limited to those described in this disclosure and those described in U.S. Pat. No. 6,199,102; U.S. Pat. No. 6,112,227; and U.S. patent application Ser. No. 10/174,561, filed Jun. 18, 2002.

3. Pre-Authorization

In one embodiment, the activity of a sender system (such as sender computer 10) may be monitored. For example, activities such as keystrokes, mouse activity, user-interface activity, or the like may be monitored. In one embodiment, the activity of a sender system may be attached to an electronic message (such as an e-mail). In response to receiving an electronic message, the recipient computer system may determine whether the associated monitored activity is consistent with a bulk messaging system, a sender of bulk messages, and/or a valid sender. If the activity is consistent with a valid sender, the electronic message may be delivered to the intended recipient. If the activity is not consistent with a valid sender and/or if the activity is consistent with the activity of a bulk messaging system or a sender of bulk messages, the electronic message may be deleted or otherwise processed.

Thus, in one embodiment, certain senders may be designated as being authorized based on events or activity that occurs before (or simultaneously with) the generation and transmission of an electronic message to a recipient. In one embodiment, heuristics may be used to identify characteristics likely to be associated with valid senders and not with mass e-mailers or others who send large volumes of unsolicited electronic messages.

It has been observed that e-mail messages and other electronic messages generated manually or personally by valid senders are typically associated with certain types of activity at sender computers. This activity involves the frequency, pattern, and content of keystrokes on a keyboard, mouse activity, clicking on certain buttons of user interfaces, etc. In contrast, computers used by mass e-mailers typically do not engage in this type of activity prior to sending unsolicited electronic messages.

In one embodiment, a sender may decide to permit their computer activity to be monitored. For example, a sender may install a software program onto their computer (such as sender computer 10). The software program may monitor the sender's computer activity and use a set of heuristics to create a digest (or other suitable data structure) that characterizes the activity prior to an electronic message being sent. The digest or other data structure may be appended or otherwise attached to the electronic message. In one embodiment, the digest or other data structure may be encrypted. In one embodiment, the digest or other data structure may comprise a history of one or more computer-related activities. In one embodiment, the digest or other data structure may comprise a characterization of a history of one or more computer-related activities according to a set of heuristics.

Accordingly, any suitable set of one or more heuristics may be used to characterize the sender's computer activity. When the characterization suggests that the electronic message is a personal message and is not unsolicited, the sender, the electronic message, or both may be the preauthorized.

In one embodiment, the preauthorization methods of this embodiment may be used as a substitute for the challenge-response methods described herein. Thus, when a sender is preauthorized based on any suitable heuristics, the electronic message may be delivered to the recipient without any challenge messages. In one embodiment, the preauthorization may be valid for only the single electronic message associated with the activity that is monitored. Of course, in other embodiments, the preauthorization methods of this embodiment may be used in combination with any of the challenge-response methods described in this disclosure and with any other suitable challenge-response method.

In one embodiment, an amount of time is measured from the start of the composition of the electronic message 40 until it is sent. For instance, if it is determined that the sender computer 10 has spent twenty seconds in composing electronic message 40 and a heuristic permits any message at composed using at least fifteen seconds, the sender, the electronic message, or both may be preauthorized. This determination may be performed using any suitable components, such software on the sender computer 10.

In one embodiment, the preauthorization may be valid until revoked. In one embodiment, the preauthorization may be valid for a limited number of one or more subsequent electronic messages. In one embodiment, the preauthorization may be valid for a limited number of one or more subsequent electronic messages over a specified period of time. In one embodiment, the preauthorization may be valid for a limited period of time.

4. Certificates of Authentication Confirming Authorization Status of Senders

In one embodiment, an authentication certificate may be associated with an electronic message. For example, in one embodiment, the authentication certificate may be a digital key that may be attached to an electronic message. A set of messaging rights may advantageously be associated with the authentication certificate. Accordingly, a sender or a sender system may obtain an authentication certificate to use with one or more electronic messages. In one embodiment, the recipient computer system may be configured to determine an authentication certificate permits the electronic message to be delivered. If the authentication certificate permits the electronic message to be delivered, the electronic message may be delivered to the intended recipient. If the authentication certificate does not permit the electronic message to be delivered, the electronic message may be deleted or otherwise processed.

For example, in one embodiment, tokens or data structures can be attached or appended to the electronic messages generated by senders. The tokens or data structures may be used by the recipient computer system to determine whether the sender is authorized based on the use of any of the confirmation or challenge methods disclosed herein. For example, the tokens can specify a score associated with a preauthorization process or can verify that the sender has received a valid certificate of authentication and is using the certificate in the approved way.

In one embodiment, a system may make use of certificates of authentication issued by the receiver system or by an authorized third party. In one embodiment, these certificates may be used to verify that time has passed. In one embodiment, these certificates may be used to verify that the sender has not used up an allowance of confirmations. In one embodiment, these certificates may be used to verify whether the sender uses one server or multiple servers (such as a server farm) that the actions authenticating a particular confirmation can be controlled by the receiver.

For example, a sender may obtain a certificate of authentication and may use the certificate to generate tokens that are attached to the electronic messages. The recipient computer system may use the tokens to help confirm that the sender has received a certificate of authentication and that the certificate is being used in accordance with the terms by which the sender is authorized to send electronic messages. The terms may specify that the sender can send electronic messages to only a limited number of different recipients during a specified period of time, such as in a single day. In this way, authorized senders can send a reasonable number of electronic messages that is less than the number that would be sent by mass e-mailers or others who send large volumes of unsolicited messages. Of course, the terms may specify that the sender may send any number of messages, to any suitable number of recipients, and over any suitable time period.

As noted above, in one embodiment, senders may obtain certificates of authentication that generate data structures that can be attached to electronic messages to confirm the sender's authorized status. This process may be initiated at any suitable time, such as, when a prospective sender contacts a web service associated with the recipient server to register and to obtain a certificate of authentication that includes a digital key. In one embodiment, the digital key can then be used to generate the data structures, or tokens, that establish the fact that the certificate has been obtained and that the authorized sender is using the certificate in ways that comply with the terms of use of the certificate.

In one embodiment, the certificate may be limited to a certain number electronic messages to distinct recipients in a period of time, such as five per hour or forty per day. For example, as the recipient server 16 receives electronic messages 40 with tokens that show the existence of a valid certificate possessed by the sender, the challenge module 42 may determine whether the sender has exceeded the number of permitted electronic messages. The number or frequency of permissible electronic messages is may be selected to be high enough to accommodate high-volume senders of valid personal electronic messages, while making it impractical for many mass e-mailers or others to send large volumes of unsolicited electronic messages. Of course, the number or frequency may be set to any suitable number.

In one embodiment, the use of the certificates of authentication may be monitored by a group of recipient servers, such as a server farm, that process incoming electronic messages for a base of subscribers to determine when those who possess certificates have exceeded the permitted number or frequency of electronic messages. A group of recipient servers may monitor incoming messages sent to an entire base of subscribers so that mass e-mailers or others who might want to send unauthorized electronic messages cannot send large volumes of messages. This method may advantageously be used to limit the number of electronic messages sent to recipients regardless of whether the sender uses one or multiple sender computers.

In one embodiment, a digital key provided to the sender after registration may be provided by a trusted certificate authority (such as a commercial service that operates the recipient servers 16 of FIG. 3, a trusted third party entity, or the like). In order to verify the identity of the sender who requests a certificate of authentication, the certificate authority may obtain identification information, may require the sender to execute a contract that specifies acceptable messaging behavior and that instructs the sender about the conditions under which the messaging service can be used to send authorized messages to senders. In one embodiment, the trusted certificate authority may issue the digital keys in a way similar to the issuance of digital certificates that have been used to encrypt data, verify the identity of parties in electronic transactions and execute digital signatures. While the process of obtaining the certificate requires some effort on part of the sender, the benefits of obtaining the certificate may include the ability to become authorized to send messages to recipients without being required to engage in certain challenge-response protocols.

5. Graduated Challenge/Response Activity

In one embodiment, one or more various challenge-response protocols are provided. The challenge-response protocols may vary according to the responses requested, such as the time, resources, and/or effort necessary for a proper response. A system may determine a value representing how consistent an electronic message is with a message from a bulk messaging system, a sender of bulk messages, and/or a valid sender. Based at least in part upon that value, the system may initiate a less intrusive challenge-response protocol, initiate a more intrusive challenge-response protocol, deliver the electronic message, delete the electronic message, or otherwise process the electronic message.

Processes of determining whether an electronic message should be delivered may involve any of a variety of challenge-response protocols, including those that have been disclosed herein. These challenge-response protocols can range from being essentially invisible or minimally intrusive from the standpoint of the sender to being inconvenient. In one embodiment of the invention, the type of challenge that is to be presented to a sender is selected based on any of a number of factors with the goal of being less intrusive while reliably reducing unsolicited electronic messages.

In one embodiment, electronic messages may be delivered to recipients without issuing any challenge messages to the senders. For example, in one embodiment, an electronic message is delivered without a challenge message because the sender has been expressly authorized by the recipient, has been implicitly authorized by the recipient based on a previous electronic message addressed to the sender by the recipient, or it otherwise authorized. Further, in some embodiment, the sender may be previously designated as being authorized based on previous challenge/response activity. In these and other situations in which it has been reliably determined that the sender is authorized, electronic messages may be delivered without an additional challenge.

In one embodiment, certain electronic messages may be determined to be unsolicited with a high degree of confidence without any challenge being issued to the sender. In one embodiment, these types of electronic messages that initially appear to be unsolicited may be delivered to the recipient after the sender has successfully responded to a set of relatively intrusive challenges that prove that the message is valid.

Information that may be used to designate senders as authorized, unauthorized, or the like may be obtained prior to the transmission of the electronic message, at the time of the transmission of the electronic message, after the transmission of the electronic message, or a combination thereof (depending on the intended purpose).

In one embodiment, the decision whether to initiate a post-transmission challenge-response process may be based on information obtained prior to or at the time of the transmission of the electronic message. The qualities of the post-transmission challenge-response process (such as how extensive, rigorous, or intrusive the challenge-response process should be) may be based on information obtained prior to or at the time of the transmission of the electronic message. An example of information obtained prior to the transmission of an electronic message may include the information gathered while monitoring pre-transmission activity of a sender computer as described above. The heuristics applied to this information may result in a score or a token that indicates the degree to which the activity is consistent with either a personal electronic message or an unsolicited electronic message. This score may then be used to determine whether to require a post-transmission challenge-response process and, if so, how extensive the challenge-response process should be. The challenge-response process can be similar to those described herein or those described in U.S. Pat. No. 6,199,102; U.S. Pat. No. 6,112,227; and U.S. patent application Ser. No. 10/174,561, filed Jun. 18, 2002. If the score indicates a high likelihood of the electronic message being a personal message generated by a valid sender, the challenge-response process may be skipped or relatively transparent to the user, such as a system-based confirmation process described herein. However, if the score is consistent with unsolicited electronic messages, the challenge-response process may be extensive and rigorous. For example, a rigorous challenge-response process may involve either a personal response to a series of challenge messages or personal responses to relatively difficult challenge puzzles that can be solved by a person but are highly unlikely to be solved by a computer or machine. In general, any suitable pre-transmission indicia of unsolicited electronic messages may be used to select the extent and rigor of post-transmission challenge-response processes.

An example of information obtained at the time of the transmission of the electronic message is information obtained using conventional spam filtering software or spam filtering software that may be developed in the future. If the filtering software finds that the content of the electronic message is highly consistent with unsolicited electronic messages, the electronic message may be discarded, may be delivered only upon the successful response to a rigorous and extensive challenge-response process, or may be processed in another suitable manner. For example, the rigorous challenge-response process may involve either a personal response to a series of challenge messages or personal responses to relatively difficult challenge puzzles that can be solved by a person but are highly unlikely to be solved by a computer or machine.

The nature of the challenge-response protocol may be selected for particular senders or domains associated with the senders to balance the considerations of avoiding unnecessary extensive or intrusive challenge-response processes when possible, while initiating enough challenges requiring appropriate responses to eliminate a large percentage of the unsolicited electronic messages that would otherwise be received by recipients in the absence of the invention.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

A variety of techniques for reducing the volume of unsolicited electronic messages received by recipients are presented herein. While combinations of these techniques can increase the confidence that unsolicited electronic messages will be reduced, individual techniques can be used in many cases to successfully achieve significant reductions in the number of unsolicited electronic messages that are delivered to recipients. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    at a recipient computer system:
        receiving an electronic message, sent from a sender system, that includes information about activities that occurred at the sender system during creation of the electronic message, wherein the information about activities that occurred at the sender system during creation of the electronic message includes information about keystroke activity, mouse activity, user-interface activity, and/or time spent composing the electronic message;
        determining whether the information included in the electronic message about activities that occurred at the sender system during the creation of the electronic message indicates the electronic message is a personal electronic message or an unsolicited message;

in accordance with a determination that the information included in the electronic message about activities that occurred at the sender system during the creation of the electronic message indicates the electronic message is a personal electronic message, processing the electronic message in a first manner, wherein the first manner delivers the electronic message to an intended recipient; and in accordance with a determination that the information included in the electronic message about activities that occurred at the sender system during the creation of the electronic message indicates the electronic message is an unsolicited message, processing the electronic message in a second manner that is distinct from the first manner, wherein the second manner filters out the electronic message.

2. The method of claim 1, wherein the first manner delivers the electronic message to an intended recipient without sending any challenge messages to the sender system.

3. The method of claim 1, wherein the first manner includes initiating a challenge-response protocol with the sender system.

4. A recipient computer system, comprising:
one or more processors;
memory; and
one or more programs, wherein the one or more programs are stored in the memory and configured to be executed by the one or more processors, the one or more programs including instructions for:
receiving an electronic message, sent from a sender system, that includes information about activities that occurred at the sender system during creation of the electronic message, wherein the information about activities that occurred at the sender system during creation of the electronic message includes information about keystroke activity, mouse activity, user-interface activity, and/or time spent composing the electronic message;
determining whether the information included in the electronic message about activities that occurred at the sender system during the creation of the electronic message indicates the electronic message is a personal electronic message or an unsolicited message;
in accordance with a determination that the information included in the electronic message about activities that occurred at the sender system during the creation of the electronic message indicates the electronic message is a personal electronic message, processing the electronic message in a first manner, wherein the first manner delivers the electronic message to an intended recipient; and
in accordance with a determination that the information included in the electronic message about activities that occurred at the sender system during the creation of the electronic message indicates the electronic message is an unsolicited message, processing the electronic message in a second manner that is distinct from the first manner, wherein the second manner filters out the electronic message.

5. The system of claim 4, wherein the first manner delivers the electronic message to an intended recipient without sending any challenge messages to the sender system.

6. The system of claim 4, wherein the first manner includes initiating a challenge-response protocol with the sender system.

7. A non-transitory computer readable storage medium storing one or more programs, the one or more programs comprising instructions, which when executed by a recipient computer system cause the recipient computer system to:
receive an electronic message, sent from a sender system, that includes information about activities that occurred at the sender system during creation of the electronic message, wherein the information about activities that occurred at the sender system during creation of the electronic message includes information about keystroke activity, mouse activity, user-interface activity, and/or time spent composing the electronic message;
determine whether the information included in the electronic message about activities that occurred at the sender system during the creation of the electronic message indicates the electronic message is a personal electronic message or an unsolicited message;
in accordance with a determination that the information included in the electronic message about activities that occurred at the sender system during the creation of the electronic message indicates the electronic message is a personal electronic message, process the electronic message in a first manner, wherein the first manner delivers the electronic message to an intended recipient; and
in accordance with a determination that the information included in the electronic message about activities that occurred at the sender system during the creation of the electronic message indicates the electronic message is an unsolicited message, process the electronic message in a second manner that is distinct from the first manner, wherein the second manner filters out the electronic message.

8. The storage medium of claim 7, wherein the first manner delivers the electronic message to an intended recipient without sending any challenge messages to the sender system.

9. The storage medium of claim 7, wherein the first manner includes initiating a challenge-response protocol with the sender system.

* * * * *